United States Patent
Arai et al.

(10) Patent No.: US 9,777,155 B2
(45) Date of Patent: Oct. 3, 2017

(54) BENZOXAZINE RESIN COMPOSITION, PREPREG, AND FIBER-REINFORCED COMPOSITE MATERIAL

(71) Applicant: TORAY COMPOSITES (AMERICA), INC., Tacoma, WA (US)

(72) Inventors: Atsuhito Arai, Tacoma, WA (US); Jeffrey A Satterwhite, Tacoma, WA (US); Johnathan C Hughes, Tacoma, WA (US); Hiroaki Sakata, Tacoma, WA (US); Kenichi Yoshioka, Tacoma, WA (US)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/410,864

(22) PCT Filed: Jun. 27, 2013

(86) PCT No.: PCT/US2013/048305
§ 371 (c)(1),
(2) Date: Dec. 23, 2014

(87) PCT Pub. No.: WO2014/004900
PCT Pub. Date: Jan. 3, 2014

(65) Prior Publication Data
US 2015/0141583 A1 May 21, 2015

Related U.S. Application Data

(60) Provisional application No. 61/664,803, filed on Jun. 27, 2012, provisional application No. 61/681,834, filed on Aug. 10, 2012, provisional application No. 61/825,259, filed on May 20, 2013.

(51) Int. Cl.
| | | |
|---|---|---|
| *C08L 63/00* | (2006.01) | |
| *C08L 79/04* | (2006.01) | |
| *C08G 73/02* | (2006.01) | |
| *C08L 79/02* | (2006.01) | |
| *C08J 5/24* | (2006.01) | |

(52) U.S. Cl.
CPC .......... *C08L 79/04* (2013.01); *C08G 73/0233* (2013.01); *C08J 5/24* (2013.01); *C08L 79/02* (2013.01); *C08J 2377/00* (2013.01); *C08J 2379/04* (2013.01); *C08J 2481/06* (2013.01); *C08L 2203/12* (2013.01); *C08L 2205/03* (2013.01); *C08L 2205/035* (2013.01); *C08L 2207/04* (2013.01)

(58) Field of Classification Search
CPC ...... C08J 5/24; C08J 2377/00; C08J 2379/04; C08J 2481/06; C08L 2207/04; C08L 2203/12; C08L 2205/03; C08L 79/02; C08L 2205/035; C08L 79/04; C08L 63/00; C08L 81/06; C08L 81/04; C08L 63/04; C08G 73/0233

USPC ................. 525/397, 390, 396, 523
See application file for complete search history.

(56) References Cited

U.S. PATENT DOCUMENTS

| | | |
|---|---|---|
| 7,537,827 B1 | 5/2009 | Lehmann et al. |
| 2002/0128354 A1 | 9/2002 | Garrett |
| 2003/0114574 A1 * | 6/2003 | Furuta ..................... C08L 81/06 524/492 |
| 2003/0139566 A1 | 7/2003 | Parthasarathy |
| 2010/0204400 A1 | 8/2010 | Kreiling et al. |
| 2011/0313080 A1 * | 12/2011 | Ihara .................. C08G 59/4014 523/400 |
| 2012/0046388 A1 | 2/2012 | Tietze et al. |

FOREIGN PATENT DOCUMENTS

| | | | | |
|---|---|---|---|---|
| JP | 2007016121 A | * | 1/2007 | ................ C08J 5/24 |
| JP | 2011026566 A | | 2/2011 | |
| WO | WO 2010092723 A1 | * | 8/2010 | ......... C08G 59/4014 |
| WO | WO 2011047939 A1 | * | 4/2011 | ......... C08G 59/4014 |
| WO | WO2011/109463 | | 9/2011 | |
| WO | WO2012/015604 | | 2/2012 | |

OTHER PUBLICATIONS

Kuroki et al., JP 2007-016121 A machine translation in English, Jan. 25, 2007.*
Jaquish et al. Final Report—Graphite Reinforced Thermoplastic Composites, Prepared for Naval Air Systems Command U.S. Department of the Navy Washington, DC 20360, Aug. 1980, p. 31.
Grishchuk et al. Structure and Properties of Amine-Hardened Epoxy/Benzoxazine Hybrids Effect of Epoxy Resin Functionality, Journal of Applied Polymer Science, 124(4):2824-2837, 2012, entire document.
Sumitomo Chemical Company, Limited, "High Heat Resistance Amorphous Polymer" Technical Notes; Sumikaexcel PES, Version 1, Sep. 2010; 35 pages.

* cited by examiner

*Primary Examiner* — David Karst
(74) *Attorney, Agent, or Firm* — Pillsbury Winthrop Shaw Pittman LLP

(57) ABSTRACT

The embodiments herein relate to a benzoxazine resin composition, a prepreg, and a carbon fiber-reinforced composite material. More specifically, the embodiments herein relate to a benzoxazine resin composition that provides a carbon fiber-reinforced composite material that is suitable for use as a manufacture material due to its superior mechanical strength in extreme use environments, such as high temperature and high moisture, as well as a prepreg, and a carbon fiber-reinforced composite material. An embodiment comprises a benzoxazine resin composition having a multifunctional benzoxazine resin; a multifunctional epoxy resin that is a liquid at 40° C. and has three or more glycidyl groups; a sulfonate ester; and optionally at least one thermoplastic resin. The resin may include an interpenetrating network structure after curing.

13 Claims, No Drawings

BENZOXAZINE RESIN COMPOSITION, PREPREG, AND FIBER-REINFORCED COMPOSITE MATERIAL

CROSS REFERENCE TO RELATED APPLICATIONS

This application is a national phase of International Application No. PCT/US2013/048305 filed on Jun. 27, 2013 which claims priority to U.S. Provisional Application No. 61/664,803 filed on Jun. 27, 2012, U.S. Provisional Application No. 61/681,834 filed on Aug. 10, 2012, and U.S. Provisional Application No. 61/825,259 filed on May 20, 2013, which are incorporated herein by reference.

FIELD OF THE INVENTION

The present invention relates to a benzoxazine resin composition, a prepreg, and a fiber-reinforced composite material, e.g., carbon fiber-reinforced composite material. More specifically, the present disclosure provides a benzoxazine resin composition for use in fiber-reinforced composite materials which has superior dynamic characteristics in extreme use environments, such as high temperature, high moisture and mechanical properties including but not limited to elasticity and elongation after curing, and which has superior mechanical properties when used in combination with reinforcing fiber as a fiber-reinforced composite material; a prepreg; and a fiber-reinforced composite material.

BACKGROUND

By utilizing their high specific strength and specific elasticity, fiber-reinforced composite materials in which carbon, glass, aramid or other structural fiber is used as reinforcing fiber have been used, in recent years, in structural materials for boats, automobiles, and the like, in sports equipment such as tennis rackets, golf clubs, and fishing rods, and in common industrial applications.

Methods for producing fiber-reinforced composite materials include methods in which an uncured matrix resin is infused into reinforcing fiber to form a sheet-form prepreg intermediate, followed by curing, and resin transfer molding methods in which liquid-form resin is made to flow into reinforcing fiber that has been placed in a mold to produce an intermediate, followed by curing. Of these production methods, with those methods that employ prepregs, the fiber-reinforced composite material is normally obtained by hot-pressing subsequent to layering multiple sheets of prepreg. The matrix resin that is used in the prepreg is commonly a thermosetting resin from the standpoint of productivity considerations.

Phenol resins, melamine resins, bismaleimide resins, unsaturated polyester resins, epoxy resins, and the like have been used as the thermosetting resin. However, from the standpoint of improving moisture resistance and heat resistance, investigations have been progressing in recent years concerning the use of benzoxazine resins as matrix resins in fiber-reinforced composite materials (e.g., see WO 03/018674).

However, benzoxazine resin is essentially a brittle material with poor toughness and elongation, and, when used alone, curing the resin requires a lengthy time of 3 h at a high temperature of 200° C. Moreover, due to its high viscosity, benzoxazine resin has the disadvantage of poor tackiness and draping properties when used as a prepreg in combination with reinforcing fiber.

In order to improve the curing properties of benzoxazine resin, the combination of benzoxazine resin, a Novolak compound, and a cationic polymerization initiator has been disclosed (e.g., see JP-2002-128987-A). However, this publication does not describe use as a fiber-reinforced composite material. In addition, although the disclosed compositions have sufficiently high reactivity, reactions progress even at room temperature due to inferior latency, and there have thus been problems with rapid degradation when used in prepregs and with poor tackiness and draping properties.

In addition, it has been disclosed that high tensile strength utilization is obtained with fiber-reinforced composite materials, provided that the tensile break elongation and fracture toughness KIc of the matrix resin satisfies a specific relationship (e.g., see JP-09-235397-A). With benzoxazine resins as well, investigations have been carried out concerning blending toughening agents such as thermoplastic resins and thermoplastic elastomers, but the solubility of these toughening agents in benzoxazine resins is low, and there have been problems with blending amounts that are sufficient for improving tensile strength. In addition, blending toughening agents increases viscosity, and there have been problems with processing and handling during prepreg production, as well as inferior tackiness and draping properties when used in prepregs.

Although multifunctional phenols have been used as curing agents along with epoxy resins in the prior art (e.g., see JP-2012-36347-A), there have been problems with deficient tackiness and draping properties when used as a prepreg due to a resulting increase in viscosity of the benzoxazine resin composition.

SUMMARY

Disclosed herein, according to an embodiment, is a benzoxazine resin composition comprising at least (A) to (D) below:
(A) a multifunctional benzoxazine resin having at least two of the structures of Formula I;
(B) a multifunctional epoxy resin that is a liquid at 40° C. and has three or more glycidyl groups;
(C) a sulfonate ester, and
(D) a thermoplastic resin comprising at least one of a polyethersulfone, a polysulfone, or a polyphenylene sulfide, the thermoplastic resin having a weight-average molecular weight of 30,000 g/mol or less.

According to an embodiment, (D) is preferably a polyethersulfone having a weight-average molecular weight of 7000 to 30,000 g/mol.

According to an embodiment, the equivalent ratio (A)/(B) of the benzoxazine functional groups of (A) and the epoxy groups of (B) is preferably 0.7 to 1.0.

According to an embodiment, the blend amount of a constituent (E) is 5 parts by weight or less with respect to 100 parts by weight of the entire benzoxazine resin composition, wherein the constituent (E) is preferably at least one type of epoxy resin curing agent that is selected from the group consisting of aromatic amines, monofunctional phenols, multifunctional phenol compounds, polyphenol compounds, and combinations thereof.

According to an embodiment, preferably 70 to 100 mass % of (B) comprises glycidylamine type epoxy.

According to an embodiment, 50 mol % or more of the terminal functional groups of the thermoplastic resin of (D) are preferably hydroxyl groups or amino groups.

According to an embodiment, preferably (C) comprises benzenesulfonate ester or toluenesulfonate ester.

According to an embodiment, the blend amount of (C) is preferably 0.5 to 5 parts by weight with respect to 100 parts by weight of the entire benzoxazine resin.

According to an embodiment, preferably the benzoxazine resin composition further comprises a constituent (G), wherein the constituent (G) comprises thermoplastic resin particles with an average particle diameter of 5 to 30 μm.

Disclosed herein, according to an embodiment, is a prepreg comprising the benzoxazine resin composition according to any of the paragraphs above and carbon fiber.

According to an embodiment, a carbon fiber-reinforced composite material comprising the prepreg according to any of the paragraphs above, wherein the prepreg is preferably cured.

Disclosed herein, according to an embodiment, is a cured resin material comprising the benzoxazine resin composition according to any of the paragraphs above.

Disclosed herein, according to an embodiment, is a carbon fiber-reinforced composite material, comprising the cured resin material above and carbon fiber.

Disclosed herein, according to an embodiment, is a benzoxazine resin composition, comprising at least (A') a benzoxazine resin, (B') an epoxy resin, and (C') a polymerization catalyst, wherein 70 to 100 percent by weight of the benzoxazine resin comprises at least two of the structures of Formula I:

Formula I

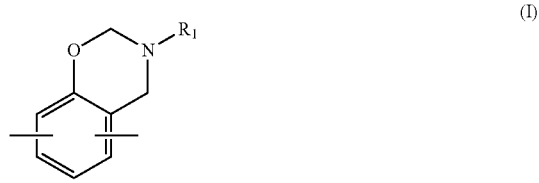

wherein the benzoxazine resin composition comprises an interpenetrating network structure after curing the benzoxazine resin composition.

According to an embodiment, the difference between an exothermic peak Ta for a reaction of the benzoxazine resin and an exothermic peak Tb for a reaction of the epoxy resin determined using a differential scanning calorimeter (DSC) at a temperature ramp rate of 10° C./min is preferably 30° C. or less.

According to an embodiment, a reaction initiation temperature determined using a differential scanning calorimeter (DSC) at a temperature ramp rate of 10° C./min is preferably in the range of 90° C. to 180° C.

According to an embodiment, preferably a rubber plateau modulus G' based on a dynamic viscoelasticity evaluation of a cured resin sample of the benzoxazine resin composition satisfies a relationship as follows: 3 MPa≤G'≤10 MPa.

According to an embodiment, preferably 50 to 100 percent by weight of the epoxy resin comprises a liquid epoxy resin that is liquid at 40° C. and possesses three or more glycidyl functional groups.

Disclosed herein, according to an embodiment, is a prepreg comprising a plurality of reinforcing fibers impregnated with the benzoxazine resin composition comprising at least (A') a benzoxazine resin, (B') an epoxy resin, and (C') a polymerization catalyst, wherein 70 to 100 percent by weight of the benzoxazine resin comprises at least two of the structures of Formula I:

wherein the benzoxazine resin composition comprises an interpenetrating network structure after curing the benzoxazine resin composition.

Disclosed herein, according to an embodiment, is a fiber-reinforced composite material comprising the prepreg according to the paragraph above.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Reference throughout this specification to "one embodiment" or "an embodiment" means that a particular feature, structure, or characteristic described in, connection with the embodiment is included in at least one embodiments. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with the present disclosure, a benzoxazine resin composition can be obtained that has superior heat resistance and superior processability as well as mechanical properties in regard to elasticity and elongation, as well as favorable curability. In addition, in accordance with the present disclosure, it is not necessary to use a large amount of additive in order to reduce the brittleness of the benzoxazine resin, and so a prepreg can be obtained that has superior handling properties in regard to having excellent tackiness and draping properties. Moreover, by using the benzoxazine resin composition of the present disclosure, a fiber-reinforced composite material with superior tensile strength and compressive strength can be obtained by curing this benzoxazine resin composition and such fiber-reinforced composite material manifests superior mechanical properties when used in combination with reinforcing fiber.

The benzoxazine resin composition, the prepreg, and the fiber-reinforced composite material of the present disclosure are described in detail below.

The inventors of the present invention carried out painstaking investigations concerning mechanisms for manifesting tensile strength and compressive strength in carbon fiber-reinforced composite materials. As a result, it was discovered that a resin that comprises (A) a multifunctional benzoxazine resin having at least two structures of formula (I), (B) a multifunctional epoxy resin that has three or more glycidyl groups, (C) a sulfonate ester, and (D) at least one thermoplastic resin selected from a polyethersulfone, a polysulfone, and a polyphenylene sulfide with a weight-average molecular weight of 30,000 g/mol or less, provides an optimal structure for achieving high levels of both tensile strength and compressive strength, which have been mutually exclusive in the past.

As explained above, the alternative embodiment relates to a benzoxazine resin composition, comprising at least (A') a benzoxazine resin, (B') an epoxy resin, and (C') a polymerization catalyst, wherein 70 to 100 percent by weight of the benzoxazine resin comprises at least two structures of Formula I, and wherein the benzoxazine resin composition comprises an interpenetrating network structure after curing the benzoxazine resin composition. Optionally, the difference between an exothermic peak Ta for a reaction of the benzoxazine resin and an exothermic peak Tb for a reaction of the epoxy resin determined using a differential scanning calorimeter (DSC) at a temperature ramp rate of 10° C./min is 30° C. or less. Optionally, a reaction initiation temperature determined using a differential scanning calorimeter (DSC) at a temperature ramp rate of 10° C./min is in the range of 90° C. to 180° C. Optionally, a rubber plateau modulus G' based on a dynamic viscoelasticity evaluation of a cured resin sample of the benzoxazine resin composition satisfies a relationship as follows: 3 MPa≤G'≤10 MPa. Optionally, 50 to 100 percent by weight of the epoxy resin comprises a liquid epoxy resin that is liquid at 40° C. and possesses three or more glycidyl functional groups. Optionally, a ratio of benzoxazine functional groups of the benzoxazine resin to glycidyl groups of the epoxy resin within the benzoxazine resin composition are in a range of 0.7 to 1.0. Optionally, the polymerization catalyst is configured to catalyze both a ring-opening polymerization of the benzoxazine resin and a polymerization of the epoxy resin. Optionally, the polymerization catalyst is at least one selected from the group consisting of a protic acid ester, a boron halide complex, an aromatic sulfonium salt, and combinations thereof. Optionally, the benzoxazine resin composition further comprises a constituent element comprising a first thermoplastic resin. Optionally, the benzoxazine resin composition further comprises a constituent element comprising a second thermoplastic resin in a form of a film, particles, fibers or a combination of these forms. Optionally, the benzoxazine resin composition is configured as a resin composition to impregnate a plurality of reinforcing fibers in order to produce a fiber-reinforced composite material. Optionally, the at least one first thermoplastic resin is selected from the group consisting of polyethersulfone, polysulfone, polyphenylene sulfide, and combinations thereof. An embodiment relates to a prepreg comprising a plurality of reinforcing fibers impregnated with the benzoxazine resin composition according to that described above. Optionally, the prepreg is a cured. An embodiment relates to a fiber-reinforced composite material comprising the prepreg described above. An embodiment relates to a cured resin material comprising the benzoxazine resin composition described above, wherein the benzoxazine resin composition has been cured. An embodiment relates to a fiber-reinforced composite material, comprising a reinforcing fiber and the cured resin material described above. An embodiment relates to a fiber-reinforced composite material component comprising a structural member of an aircraft, a rocket motor case, an artificial satellite, a drive shaft, a leaf spring, a windmill blade, a pressurized vessel, a flywheel, a roofing material, a cable, a reinforcing bar, a sporting good or combinations thereof. An embodiment relates to a method of manufacturing a fiber-reinforced composite material comprising impregnating reinforcing fibers with the benzoxazine resin composition described above to form impregnated reinforcing fibers. Optionally, the method could comprise curing the impregnated reinforcing fibers.

The inventors of the present disclosure carried out painstaking investigations concerning benzoxazine resin composition reactions and mechanisms for manifesting strength. As a result, it was discovered that a resin that includes a benzoxazine resin (A') having structures of Formula (I), an epoxy resin (B'), and a polymerization catalyst (C'), by virtue of having an interpenetrating network structure in the benzoxazine resin composition subsequent to curing, provides superior elasticity and elongation, while also manifesting superior mechanical properties, even when used in combination with reinforcing fiber in a fiber-reinforced composite material. The "interpenetrating network structure" referred to herein indicates a structure in which a network structure (a) formed by the polymerization of (A') is superimposed on a network structure (b) formed by the polymerization of (B'), with the two network structures intertwined with each other. The network structure (a) and the network structure (b) may have parts that are partially bonded. By virtue of being partially bonded, large-scale separations between the network structure (a) and the network structure (b) are prevented, thereby aiding in the production of an intertwined structure. In addition, a semi-interpenetrating network structure may be formed in which a thermoplastic linear polymer (c) is added, with the linear polymer (c) intertwining with the interpenetrating network structure (a-b) including the network structure (a) and the network structure (b). At the least, the addition of a high-toughness thermoplastic resin component contributes not only to improving the toughness of the benzoxazine resin composition, but also facilitates adjustment of the viscosity of the benzoxazine resin composition, affording appropriate tackiness and draping properties when producing a prepreg. With the benzoxazine resin composition of the present disclosure, the exothermic peak temperature differential determined using a differential scanning calorimeter (also referred to below as a "DSC") is preferably within the range of 30° C. in terms of the difference between Ta and Tb, where Ta is the exothermic peak for the reaction of the benzoxazine resin (A'), and Tb is the exothermic peak for the reaction of the epoxy resin (B'). If the difference between Ta and Tb is too great, then the timing difference between the polymerization reactions of (A') and (B') will be too great, and the polymerization that occurs first will limit or prevent the polymerization of the resin having lower reactivity. Alternatively, the cured resin structure will not take on an interpenetrating network structure, the A and B polymers will have large-scale separations, and high strength may not be maintained. It is preferable for the temperature differential between Ta and Tb to be small, and the thermal peak may in some cases be regarded as singular when the different between Ta and Tb is within the range of 10° C. The exothermic peak temperatures Ta and Tb determined by DSC in the present disclosure are values that are measured under conditions of a 10° C./min temperature ramp rate.

The benzoxazine resin composition of the present disclosure preferably has a reaction initiation temperature as measured by DSC (exothermic initiation temperature) that is within the range of 90 to 180° C. If the reaction initiation temperature (exothermic initiation temperature) is too low, then storage stability or viscosity stability during prepreg production (pot life) will be compromised. If the reaction initiation temperature is too high, however, then high temperatures or a long period of time will be required for curing the benzoxazine resin composition. When the polymerization reaction of (A') or (B') occurs at an excessively high temperature, the rate of side reactions such as transfer reactions and decomposition reactions will increase, and a resin structure that is desirable for manifesting good mechanical properties will not be obtained in some cases.

The benzoxazine resin composition of the present disclosure in which the reaction initiation temperatures is in the range of about 90° C. to about 180° C. undergoes rapid curing at about 150° C. to about 200° C. and has superior viscosity stability during prepreg production (pot life). The composition is thus desirable as a resin composition for fiber-reinforced composite materials. The reaction initiation temperature measured by DSC in the present disclosure is the value measured under conditions of a 10° C./min temperature ramp rate.

The resin sheet that is produced by curing the benzoxazine resin composition of the present disclosure preferably has a rubber plateau modulus G' in the range of 3 MPa≤G'≤10 MPa, based on the dynamic viscoelasticity evaluation method described below.

Rubber plateau modulus reflects crosslink density in a cured material, with crosslink density decreasing as the rubber plateau modulus decreases. In addition, the rubber plateau modulus G' increases as reactions between the phenolic hydroxyl groups generated by (A') and the glycidyl groups of (B') progress too far, resulting in a single network structure. As a result, sufficient toughness and elongation are not manifested. Benzoxazine resin compositions in which the rubber plateau modulus G' is in the range of 3 MPa≤G'≤10 MPa have high-level heat resistance and mechanical properties, while also manifesting excellent mechanical properties when used as a fiber-reinforced composite material. The specific method for evaluating kinetic viscoelasticity in the present disclosure is described in the working examples.

The benzoxazine compound (A) and (A') that are used in the present disclosure have structural units (I) that are represented by general Formula (I) below.

Formula I

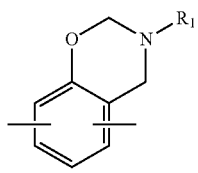

(I)

In Formula I, $R_1$ denotes a linear alkyl group with a carbon number of 1 to 12, a cyclic alkyl group with a carbon number of 3 to 8, a phenyl group, or a phenyl group that is substituted with a linear alkyl group having a carbon number of 1 to 12 or a halogen, with a hydrogen being bonded to at least one of the carbon atoms at the ortho-position and the para-position with respect to a carbon atom to which an aromatic-ring oxygen atom is bonded.

In the structural unit (I) represented by the general Formula above, non-limiting examples of R1 include a methyl group, ethyl group, propyl group, isopropyl group, n-butyl group, isobutyl group, t-butyl group, cyclopentyl group, cyclohexyl group, phenyl group, o-methylphenyl group, m-methylphenyl group, p-methylphenyl group, o-ethylphenyl group, m-ethylphenyl group, p-ethylphenyl group, o-t-butylphenyl group, m-t-butylphenyl group, p-t-butylphenyl group, o-chlorophenyl group, and o-bromophenyl group. Among these groups, from the standpoint of contributing to favorable handling properties, it is preferable to use a methyl group, ethyl group, propyl group, phenyl group, or o-methylphenyl group.

In the present disclosure, it is preferable to use a monomer represented by the structural Formulas (II) to (XIII) below as the benzoxazine resin.

Formula II

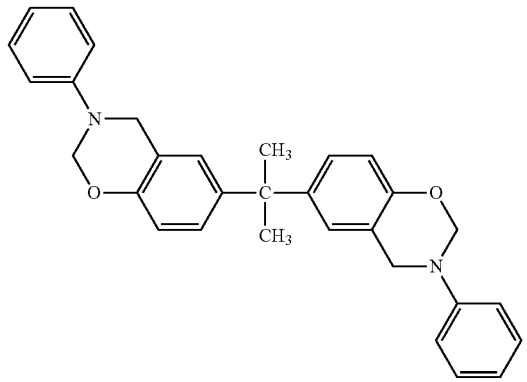

(II)

Formula III

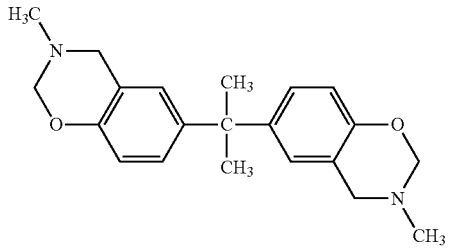

(III)

Formula IV

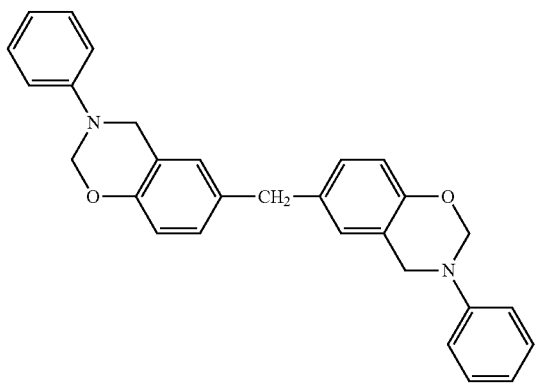

(IV)

Formula V

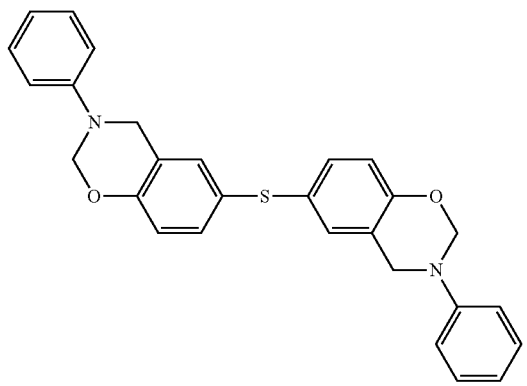

(V)

Formula VI
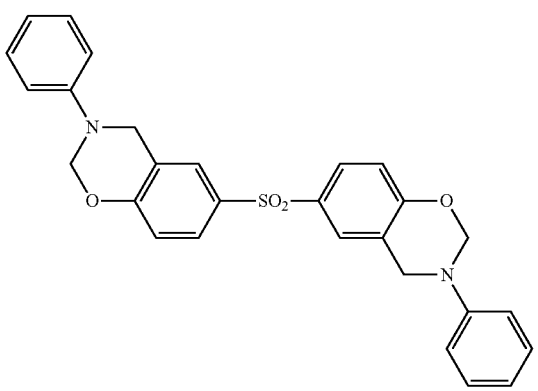
(VI)
Formula VII
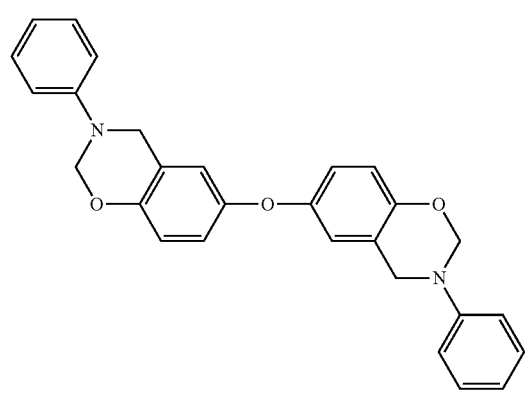
(VII)
Formula VIII
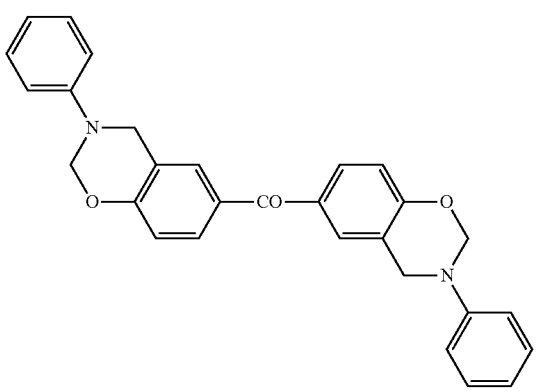
(VIII)
Formula IX
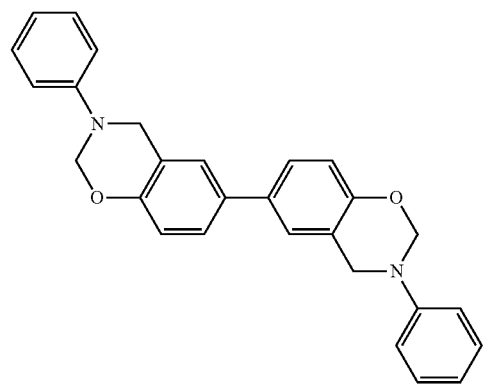
(IX)
Formula X
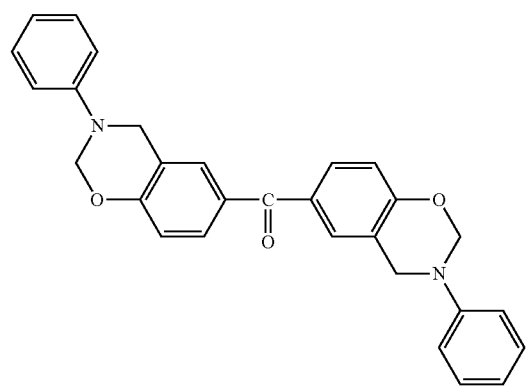
(X)
Formula XI
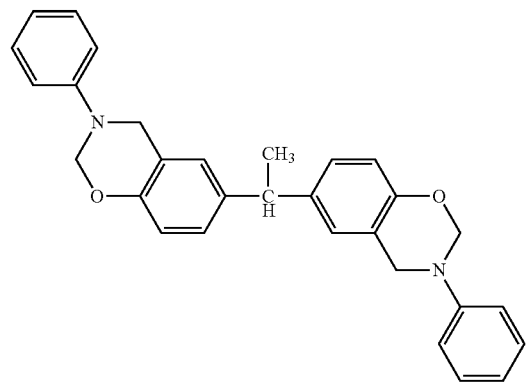
(XI)

-continued

Formula XII (XII)

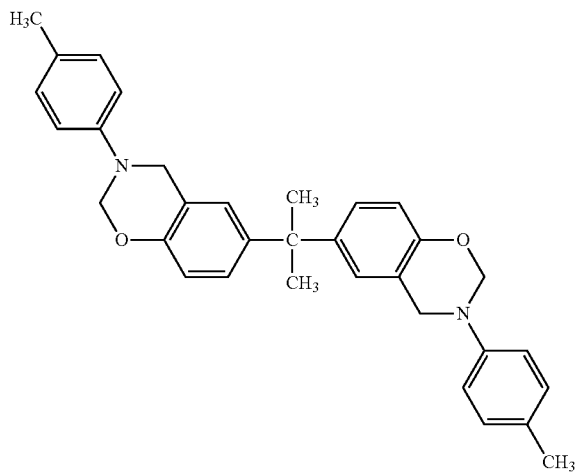

Formula XIII (XIII)

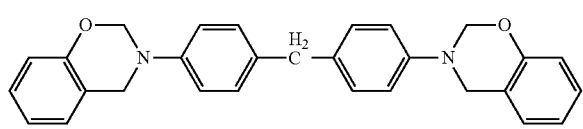

The benzoxazine resin of the (A) component and the (A') component may be composed of monomer alone or may have the form of an oligomer in which multiple molecules are polymerized. In addition, benzoxazine resins having different structures may be used together. The benzoxazine ring has excellent flame resistance due to the production of a backbone that is similar to that of phenol resins, resulting from ring-opening polymerization. In addition, its dense structure provides excellent dynamic characteristics and mechanical properties related to high elasticity, as well as low moisture absorption.

The benzoxazine resin of (A) and (A') may be procured from a number of suppliers, including Shikoku Chemicals Corp., Konishi Chemical Inc., Co., Ltd., and Huntsman Advanced Materials. Among them, Shikoku Chemicals Corp. offers a bisphenol A-aniline type benzoxazine resin, a bisphenol A methylamine type benzoxazine resin, and a bisphenol F aniline type benzoxazine resin. Rather than using commercially-available raw material, the benzoxazine resin can be prepared, as necessary, by allowing a reaction to occur between a phenolic compound (e.g., bisphenol A, bisphenol F, bisphenol S, or thiodiphenol), an aldehyde and an arylamine Detailed preparation methods may be found in reference to U.S. Pat. Nos. 5,543,516, 4,607,091 (Schreiber), U.S. Pat. No. 5,021,484 (Schreiber), and U.S. Pat. No. 5,200,452 (Schreiber).

When at least 70 to 100 wt % of (A') is a multifunctional benzoxazine resin having at least two structures of Formula 1, a crosslinking density that is suitable for a cured resin is obtained, but this condition is also preferred for obtaining superior heat resistance and superior mechanical properties.

In the alternative embodiment, (B') is an epoxy resin, which could be a liquid at 40° C. and has three or more glycidyl groups, controls the viscosity of the benzoxazine resin composition, provides heat resistance after curing, and forms an interpenetrating network structure with the benzoxazine of (A'), primarily by anionic polymerization or cationic polymerization during the curing reaction. Any epoxy resin may be used in any embodiments, provided that it has two or more glycidyl groups per molecule. In particular, epoxy resins that are liquids at 40° C. are preferred from the standpoint of facility in controlling the viscosity of the benzoxazine resin composition. In regard to the term "liquid" used herein, the thermosetting resin is defined as being a liquid when a 1 cm$^3$ of metal spherical piece with a specific gravity of 7 or greater immediately sinks under gravity when placed on the thermosetting resin to be measured that is at the same temperature. Examples of metal pieces with specific gravities of 7 or greater include iron (steel), cast iron, copper, and the like.

The multifunctional epoxy resin (B) of the embodiments herein that is a liquid at 40° C. and has three or more glycidyl groups is a compound that has three or more epoxy groups per molecule. Examples of the epoxy resin (B) having three or more functional groups include glycidylamine type epoxy resins and glycidyl ether type epoxy resins.

In (B), the number of functional groups is preferably 3 to 7, more preferably 3 to 4, from the standpoint of providing both high heat resistance and low viscosity. If the number of functional groups is too great, then the cured matrix resin will become brittle, and impact resistance may suffer.

Examples of (B) used in the embodiments herein include glycidylamine type epoxy resins such as diaminodiphenylmethane type, diaminediphenylsulfone type, diaminodiphenyl ether type, aminophenol type, metaxylenediamine type and isocyanurate type epoxy resins, as well as glycidyl ether type epoxy resins such as phenol Novolak type epoxy resins. Among them, from the standpoint of balance of physical properties, viscosity, and compatibility with the (D) component, glycidylamine type epoxy resins such as diaminodiphenylmethane type, diaminodiphenyl ether type, and aminophenol type epoxy resins are particularly preferred.

Regarding the ratio of the (A) component and the (B) component, the ratio (A)/(B) of benzoxazine ring equivalents (active hydrogen equivalents generated from the benzoxazine ring) of the (A) component with respect to the active hydrogen equivalents of the epoxy resin of the (B) component is preferably in the range of 0.7 to 1.0. Within this range, viscosity that is suitable for manufacture processes is obtained, while also producing suitable pressure-sensitive adhesion (tackiness) and deformability (draping properties) in prepregs. In addition, because low moisture absorption and high elasticity are maintained in the benzoxazine resin composition, the material will provide superior mechanical characteristics in hot and wet environments when used as a composite material.

If the blend amount of the (B') component is too small, then the viscosity of the benzoxazine resin composition will increase, which will compromise manufacture processability as well as, in some cases, viscosity (tackiness) and deformability (draping properties) during prepreg formation. If the blend amount of the (B') component is too great, however, then characteristics of low moisture absorption and high elasticity which are characteristics of the benzoxazine compound will be lost. As a result, the mechanical properties when used as a composite material in hot moist environments will tend to be compromised. For this reason, regarding the ratio of the (A') component and the (B') component, the ratio (A')/(B') of benzoxazine ring equivalents (active hydrogen equivalents generated from the benzoxazine ring) of the (A') component with respect to the active hydrogen equivalents of the epoxy resin of the (B') component is preferably in the range of 0.5 to 1.2, or 0.75 to 1.0. At the least, the benzoxazine resin composition having an (A')/(B') ratio in the range of 0.5 to 1.2 has favorable processability and favorable pressure-sensitive adhesion (tackiness) and deformability (draping properties) in prepregs. In addition, because low moisture absorption and high elasticity are maintained in the benzoxazine resin composition, the material will provide superior mechanical characteristics in hot and wet environments when used as a composite material.

Specific examples of epoxy resins that may be cited are bisphenol type epoxy resins such as bisphenol A type epoxy resins, bisphenol F type epoxy resins, bisphenol S type epoxy resins, tetrabromobisphenol A type epoxy resins; Novolak type epoxy resins such as phenol Novolak type epoxy resins and cresol Novolak type epoxy resins; glycidylamine type epoxy resins such as tetraglycidyl diaminodiphenylmethane, triglycidyl aminophenol, tetraglycidyl xylenediamine, glycidyl aniline, and glycidyl o-toluidine; isocyanate-modified epoxy resins containing oxazolidone rings; epoxy resins having biphenyl backbones; epoxy resins having naphthalene backbones; epoxy resins having triphenylmethane backbones; epoxy resins having dicyclopentadiene backbones; and cycloaliphatic epoxy resins. These epoxy resins may be used individually or in combinations.

The epoxy resin (B') preferably contains a glycidylamine type epoxy resin. The blend amount of the glycidylamine type epoxy resin is preferably 40 to 100 wt % with respect to the entire epoxy resin (B'). In order to control the viscosity of the benzoxazine resin composition and to provide heat resistance after curing, multifunctional glycidylamine type epoxy resins having three or more glycidyl groups which are liquids at 40° C. are particularly preferred among these compounds. Examples that may be cited include glycidylamine type epoxy resin such as diaminodiphenylmethane type, diaminodiphenyl sulfone type, diaminodiphenyl ether type, aminophenol type, metaxylenediamine type, and isocyanurate type epoxy resins, or glycidyl ether type epoxy resins such as phenol Novolak type epoxy resins. Among these compounds, glycidylamine type epoxy resins such as diaminodiphenylmethane type, diaminodiphenyl ether type and aminophenol type epoxy resins are particularly preferred from the standpoint of balance of physical properties and favorable viscosity.

Examples of commercially-available products for (B) and (B') include diaminodiphenylmethane type epoxy resins such as ELM434 (Sumitomo Chemical Co., Ltd.), Araldite® MY720, Araldite® MY721, Araldite® MY9512, and Araldite® MY9663 (Huntsman Advanced Chemicals), and Epotohto® YH-434 (Tohto Kasei Co., Ltd.).

An example of a commercially available metaxylenediamine type epoxy resin is TETRAD-X (Mitsubishi Gas Chemical Co., Inc.).

An example of a commercially-available 1,3-bisaminomethylcyclohexane type epoxy resin is TETRAD-C (Mitsubishi Gas Chemical Co., Inc.).

An example of a commercially-available isocyanurate type epoxy resin is TEPIC-P (Nissan Chemical Industries Ltd.).

Examples of commercially-available aminophenol type epoxy resins include ELM120, ELM100 (Sumitomo Chemical Co., Ltd.), jER® 630 (Mitsubishi Chemical Corporation), Araldite® MY0510 (Huntsman Advanced Materials), Araldite® MY0600 (Huntsman Advanced Materials), and Araldite® MY0610 (Huntsman Advanced Materials).

Examples of commercially-available phenol Novolak type epoxy resins include Araldite® EPN1139 (Huntsman Advanced Materials).

The embodiments herein also include epoxy resins other than (B), and copolymers of epoxy resins and thermosetting resins. Examples of thermosetting resins that are used by copolymerization with epoxy resins include unsaturated polyester resin, vinyl ester resin, epoxy resin, benzoxazine resin, phenol resin, urea resin, melamine resin, and polyimide resin. These resin compositions or compounds may be used individually or in suitable blends. By blending at least an epoxy resin other than (B), a material with both resin fluidity and cured heat resistance is produced.

Of the epoxy resins that are used as epoxy resins other than (B), preferred bifunctional epoxy resins are glycidyl ether type epoxy resins having phenol as a precursor. Examples of these epoxy resins include bisphenol A type epoxy resin, bisphenol F type epoxy resin, bisphenol S type epoxy resin, naphthalene type epoxy resin, biphenyl type epoxy resin, urethane-modified epoxy resin, hydantoin type epoxy resin, and resorcinol type epoxy resin. In addition, in order to adjust the rheology of the benzoxazine resin composition, it is desirable to blend a small amount of multifunctional epoxy resin that is a solid at 40° C., such as a trishydroxyphenylmethane type, tetraphenylolethane type, orthocresol Novolak type or dicyclopentadiene type epoxy resin.

Liquid bisphenol A type epoxy resins, bisphenol F type epoxy resins, and resorcinol type epoxy resins preferably are used in combination with other epoxy resins due to their low viscosity.

In addition, solid bisphenol A type epoxy resins have reduced heat resistance due to structures with low crosslinking density in comparison to liquid bisphenol A type epoxy resins, but because a structure with high toughness is produced, they are used in combination with glycidylamine type epoxy resins, or liquid bisphenol A type epoxy resins and bisphenol F type epoxy resins.

The epoxy resin having a naphthalene backbone provides a cured resin with low moisture absorption and high heat resistance. In addition, biphenyl type epoxy resins, dicyclopentadiene type epoxy resins, phenol aralkyl type epoxy resins, and diphenylfluorene type epoxy resins are desirable to use because they provide a cured resin with low moisture absorption. Urethane-modified epoxy resins and isocyanurate-modified epoxy resins provide a cured resin with high fracture toughness and elongation.

Examples of commercially-available bisphenol A type (Novolak type) epoxy resins include EPON® 825 (Mitsubishi Chemical Corporation), Epiclon® 850 (DIC Corporation), Epotohto® YD-128 (Tohto Kasei Co., Ltd.), and DER-331 and DER-332 (Dow Chemical Company).

Examples of commercially-available bisphenol F type epoxy resins include jER® 806, jER® 807 and jER® 1750 (Mitsubishi Chemical Corporation), Epiclon® 830 (DIC Corporation), and Epotohto® YD-170 (Tohto Kasei Co., Ltd.).

Examples of commercially-available resorcinol type epoxy resins include Denacol® EX-201 (Nagase ChemteX Corp.).

Examples of commercially-available glycidyl aniline type epoxy resins include GAN and GOT (Nippon Kayaku Co., Ltd.).

Examples of commercially-available biphenyl type epoxy resins include NC-3000 (Nippon Kayaku Co., Ltd.).

Examples of commercially-available urethane-modified epoxy resins include AER4152 (Asahi Kasei Corporation epoxy).

Examples of commercially-available hydantoin type epoxy resins include AY238 (Huntsman Advanced Materials).

Examples of commercially-available tris-hydroxyphenyl methane type epoxy resins include Tactix 742 (Huntsman Advanced Materials).

Examples of commercially-available tetraphenylol ethane type epoxy resins include jER® 1031S (Mitsubishi Chemical Corporation).

Examples of commercially-available orthocresol Novolak type epoxy resins include EOCN-1020 (Nippon Kayaku Co., Ltd.) and Epiclon® N-660 (DIC Corporation).

Examples of commercially-available dicyclopentadiene type epoxy resins include Epiclon® HP7200 (DIC Corporation).

The polymerization catalyst (C') may be any type of compound selected from epoxy resin cationic polymerization catalysts or anionic polymerization catalysts such as a sulfonate ester, provided optionally that the parameters of Ta and Tb are satisfied. Individual compounds may be used, or a plurality of compounds may be used in combination. The polymerization catalyst (C') promotes both ring-opening polymerization of the benzoxazine (A') and polymerization of the epoxy resin (B'). It is desirable for the benzoxazine resin and/or parameters of Ta and Tb to be satisfied in order for the (A') component as well as the reaction between the epoxy resin of the (B') component and the phenolic hydroxyl groups of the benzoxazine resin of the (A') component that are present subsequent to ring-opening and optionally to form an interpenetrating network structure and for the resin to have superior mechanical properties.

Examples of polymerization catalysts for cationic polymerization systems include Lewis acids and Bronsted acids, metal halides, and organometallic reagents. Examples of polymer catalysts for anionic polymerization systems include imidazole derivatives, tertiary amines, and phosphines.

Among those catalysts, it is preferable to use Lewis acid complexes or Bronsted acid salts. These are suitable polymerization catalysts for the benzoxazine resin composition of the present disclosure because they provide superior stability at room temperature (25° C.) and in prepreg production processes (about 50° C. to about 90° C.), endow the resin with rapid curing properties at low curing temperatures, and facilitate adjustment of the reaction initiation temperature (exothermic initiation temperature) to within the range of about 90° C. to about 180° C.

Examples of Lewis acid complexes and Bronsted acid salts include protic acid esters, halogenated boron complexes, aromatic sulfonium salts, aromatic diazonium salts, aromatic pyridinium salts, and aromatic iodonium salts.

Examples of protic acids include toluenesulfonate esters and benzenesulfonate esters.

Specific examples of toluenesulfonate esters include methyl p-toluenesulfonate, ethyl p-toluenesulfonate, n-propyl p-toluenesulfonate, cyclohexyl p-toluenesulfonate, 1,3-propanediyl di-p-toluenesulfonate, 2,2-dimethyl-1,3-propanediol bis(toluenesulfonate), and 4,(4-((phenylsulfonyl) oxy)phenoxy)phenyl p-toluenesulfonate. In addition, specific examples of benzenesulfonate esters include methyl benzenesulfonate, ethyl benzenesulfonate, n-propyl benzenesulfonate, cyclohexyl benzenesulfonate, 1,3-propanediyl dibenzenesulfonate, 2,2-dimethyl-1,3-propanediol bis(benzenesulfonate), and 4-(4-((phenylsulfonyl)oxy)phenoxy) phenyl benzenesulfonate. These toluenesulfonate esters and benzenesulfonate esters may be procured from reagent manufacturers such as Sigma-Aldrich Co. or Tokyo Chemical Industry Co., Ltd.

Examples of halogenated boron complexes include boron trifluoride-piperidine complex, boron trifluoride-monoethylamine complex, boron trifluoride-triethanolamine complex (all Stella Chemifa Corp.), and boron trichloride-octylamine complex (Huntsman Advanced Materials).

Examples of aromatic sulfonium salts include the antimony hexafluoride system sulfonium salt SAN-AID® SI-L85, SAN-AID SI-L145, SAN-AID SI-L160, SAN-AID SI-H15, SAN-AID SI-H20, SAN-AID SI-H25, SAN-AID SI-H40, SAN-AID SI-H50, SAN-AID SI-60L, SAN-AID SI-80L, SAN-AID SI-100L, SAN-AID SI-80, SAN-AID SI-100, and SAN-AID SI-150 (Sanshin Chemical Industry KK.), and the phosphorus hexafluoride system sulfonium salts SAN-AID SI-110, SAN-AID SI-110L and SAN-AID SI-180L (Sanshin Chemical Industry KK).

Examples of aromatic diazonium salts include Americure (American Can Co.) and Ultraset (Adeka Corp.). In addition, examples of iodonium salts include diphenyliodonium hexafluoroarsinate, bis(4-chlorophenyl)iodonium hexafluoroarsinate, bis(4-bromophenyl)iodonium hexafluoroarsinate, phenyl(4-methoxyphenyl)iodonium hexafluoroarsinate, UV-9310C (Toshiba Silicone), Photoinitiator 2074 (Rhône-Poulenc), UVE series products (General Electric Corp.), and FC series products (3M).

Examples of aromatic pyridinium salts include N-benzyl-4-benzoylpyridinium hexafluoroantimonate, N-cinnamyl-2-cyanopyridinium hexafluoroantimonate, and N-(3-methyl-2-butenyl)-2-cyanopyridinium hexafluorophosphate, which can be found in JP-04-327574-A, JP-05-222122-A, and JP-05-262813-A.

Examples of aromatic iodonium salts include Rhodorsil PI2074 (Rodia Co.).

Among these compounds, using at least one selected from the group consisting of protic acid esters, halogenated boron complexes, and aromatic sulfonium salts provides the benzoxazine resin composition with rapid curing at about 150° C. to about 180° C. and superior stability at room temperature (25° C.) or during prepreg production processes (about 50° C. to about 90° C.).

(C) in the embodiments herein is a sulfonate ester which promotes the ring-opening reaction of the benzoxazine rings of the benzoxazine resin of the (A) component as well as the reaction between the epoxy resin of the (B) component and the phenolic hydroxyl groups of the benzoxazine resin of the (A) component that are present subsequent to ring-opening. In other words, by blending (C), curing of the benzoxazine resin composition of the embodiments herein can occur in a short period of time in comparison to conventional compositions. On the other hand, (C) is in an esterified state at room temperature and thus has poor reaction promoting effects, so the resin composition of the embodiments herein has superior stability at room temperature (25° C.) or during prepreg production processes (approximately 90° C.)

From the standpoint of stability at room temperature, toluenesulfonate ester and benzenesulfonate ester are preferred.

Specific examples of toluenesulfonate esters and benzenesulfonate esters include the same compounds described above.

The sulfonate ester of (C) is preferably used at 0.5 to 5 parts by weight with respect to 100 parts by weight of the entire benzoxazine resin composition. In particular, within this range, there will be reaction promoting effects in the benzoxazine resin composition at 150 to 200° C., superior storage stability at room temperature, as well as superior viscosity stability (pot life) during prepreg production processes. In addition, there will be no adverse effects on resin characteristics of the benzoxazine resin composition, such as Tg, and an unexpected increase in tensile strength will occur when used as a carbon fiber-reinforced composite material. Moreover, the blend amount may be suitably adjusted in consideration of the reactivity of the (A) component, and 0.5 to 2 parts by weight of (C) may be blended with respect to 100 parts by weight of the entire benzoxazine resin composition when the reactivity of the (A) component is high, whereas 2 to 5 parts by weight of (C) may be blended with respect to 100 parts by weight of the entire benzoxazine resin composition when the reactivity of the (A) component is low.

The thermoplastic resin of (D) in the embodiments herein increases the toughness of the benzoxazine resin composition and also increases mechanical properties of tensile strength, the 90° strength, and the interlayer toughness of the composition when used in composite materials. In addition, the component is necessary for providing suitable tackiness and draping properties when producing prepregs.

Examples of (D) include polyvinylacetal resin, polysulfone, polyphenylene sulfide, polyethersulfone, polyether ether ketone, and polyether imide. These thermoplastic resins may be used individually or in combination as a polymer alloy. Polyethersulfone is particularly preferred from the standpoint of compatibility with the (B) component.

The molecular weight of (D) is preferably a weight-average molecular weight of 30,000 mol/g or less. More preferably, the weight-average molecular weight is 7000 to 30,000 mol/g. If less than 7000, the effect of improvement in physical properties will be slight, and the heat resistance of the benzoxazine resin composition will suffer. If greater than 30,000, compatibility with the benzoxazine resin composition will be poor, and no improvement in physical properties will be obtained in the benzoxazine resin composition or the carbon fiber-reinforced composite material. In addition, when dissolved, the viscosity will be too high even when blended in small amounts, and the tackiness and draping properties will decline when producing prepregs. When (D) having a weight-average molecular weight of 7000 to 30,000 mol/g is used, this has the effect of improving compatibility with the benzoxazine resin composition and of improving physical properties without compromising the heat resistance of the benzoxazine resin composition. Moreover, suitable tackiness and draping properties are provided when producing prepregs.

The average molecular weight referred to in the embodiments herein indicates the number-average molecular weight obtained by gel permeation chromatography ("GPC" below). Examples of the method for measuring number-average molecular weight include a method wherein two Shodex 80M® [columns] (manufactured by Showa Denko) and one Shodex 802® [column] (manufactured by Showa Denko) are used, 0.3 µL of sample is injected, and the retention time of the sample measured at a flow rate of 1 mL/min is converted to molecular weight by utilizing the retention time of a calibration sample composed of polystyrene. When multiple peaks are observed in liquid chromatography, the target components are separated beforehand by liquid chromatography, and each component is then subjected to GPC, followed by molecular weight conversion.

With the thermoplastic resin polymer of (D), 50 mol % or more of the terminals preferably are hydroxyl groups or amino groups. As a result of reactions of these terminal functional groups with (A) and (B), the affinity with resins composed of (A) and (B) is increased, and uniform compatibilization will occur. Even if uniform compatibilization does not occur, high interfacial adhesion will occur between the resin phase composed of (A) and (B) and the thermoplastic resin of (D), resulting in a dramatic improvement in physical properties when a benzoxazine resin composition is produced. In light of these considerations, it is preferable for a high proportion of the polymer terminals of the thermoplastic resin of (D) to be hydroxyphenyl groups or amino groups, and it is preferable for 50 mol % or more of all of the polymer terminals to be hydroxyphenyl groups or amino groups.

The proportion of terminals that are hydroxyl groups or amino groups can be measured by an NMR method or a titration method. A specific example of the use of an NMR method with polyethersulfone involves the use of high-resolution $^1$H-NMR in deuterated DMSO solvent at 400 MHz and 100 scans to observe protons adjacent to the chloro-substituted aromatic carbons ($^1$HCl) at 7.7 ppm and protons adjacent to hydroxyl-substituted aromatic carbons ($^1$HOH) at 6.9 ppm. The $^1$H-NMR surface area ratio reflects the number of moles [of these hydrogens], and so the terminal functional group composition (mol %) can be calculated using the formula below.

Terminal hydroxyl group composition (mol %)=
[$^1$HOH peak surface area]/([$^1$HOH peak surface area])+([$^1$HCl peak surface area])×100.

With the polyethersulfone in (D) of the embodiments herein, there are no particular restrictions on the manufacture method, and production can be carried out by the methods described, for example, in JP-42-7799-B and JP-45-21318-B, and JP-48-19700-A. In these publications, [the polyethersulfone] can be obtained by allowing a divalent phenol compound such as 4,4'-dihydroxydiphenylsulfone and a divalent dihalogenodiphenyl compound such as 4,4'-dichlorodiphenylsulfone to undergo polycondensation in an aprotic polar solvent such as N-methylpyrrolidone, DMF, DMSO, or sulfolane in the presence of an alkali metal compound such as sodium hydroxide, potassium hydroxide, sodium carbonate, or potassium carbonate. From the standpoint of productivity, an aspect is preferred in which (D) is a powder with an average particle diameter of 2 to 200 µm, because the kneading time for (D) when preparing the benzoxazine resin composition can be shortened.

Specific examples of (D) in the embodiments herein include Virantage® VW10700RP, Virantage VW30500RP (Solvay Specialty Polymers Japan); and the polyethersulfone and polyether ether sulfone copolymer oligomers described in JP-2004-506789-A.

Thermoplastic resins other than (D) may be added in ranges in which they can be uniformly mixed or dissolved in the benzoxazine resin composition. Examples of this thermoplastic resin generally include those thermoplastic resins whose primary chains contain a bond selected from the group consisting of a carbon-carbon bond, amide bond, imide bond, ester bond, ether bond, carbonate bond, urethane bond, thioether bond, sulfone bond, and carbonyl bond. The thermoplastic resin may be partially crosslinked and may be either crystalline or amorphous. Particular examples include polyamide, polycarbonate, polyacetal, polyphenylene oxide, polyallylate, polyester, polyamide-imide, polyimide, polyetherimide, polyimide having phenyltrimethylindane structures, polysulfone, polyether ether ketone, polyaramid, polyether nitrile, and polybenzimidazole. These examples are preferred, because they improve adhesion between the reinforcement fibers and the benzoxazine resin composition, and because they facilitate adjusting the viscosity based on molecular weight selection and blend amount adjustment.

It is preferable for (D) to be blended in the range of 2 to 20 parts by weight with respect to a total of 100 parts by weight of (A) and (B). In this case, the toughness of the benzoxazine resin composition is improved. Therefore, the tensile strength and dynamic characteristics such as the 90° strength and the interlayer toughness are improved when a composite material is produced. In addition, because suitable resin viscosity can be readily obtained, suitable tackiness and draping properties can be provided when producing prepregs In the present disclosure, a thermoplastic resin (D') may also be mixed or dissolved in ranges in which the mechanical properties or processability of the benzoxazine resin composition are not compromised. Examples of this thermoplastic resin generally include those thermoplastic resins whose backbone chains contain a bond selected from the group consisting of a carbon-carbon bond, amide bond, imide bond, ester bond, ether bond, carbonate bond, urethane bond, thioether bond, sulfone bond, and carbonyl bond. The thermoplastic resin may be partially crosslinked and may be either crystalline or amorphous. In particular, it is preferable for at least one resin selected from the group consisting of polyamide, polycarbonate, polyacetal, polyphenylene oxide, polyphenylene sulfide, polyallylate, polyester, polyamide-imide, polyimide, polyetherimide, polyimide having phenyltrimethylindane structures, polysulfone, polyethersulfone, polyether ketone, polyether ether ketone, polyaramid, polyether nitrile, and polybenzimidazole, to be mixed or dissolved in any of the components (A') and (B') that are contained in the benzoxazine resin compositions described above.

This component (D') improves mechanical properties such as the toughness and elongation of the benzoxazine resin composition of the present disclosure, facilitates adjustment of the viscosity of the composition, and provides favorable tackiness or draping properties during prepreg production. In addition, effects such as improved external product value of the end molded product are obtained, because the flow of the resin composition during molding of the carbon fiber-reinforced composite material can be adjusted to a suitable range.

The glass transition temperature (Tg) of the component (D') is 150° C. or greater so that favorable heat resistance is obtained, with 170° C. or greater being preferred. If the glass transition temperature of the component (D') that is blended is less than 150° C., the resulting moldings will tend to suffer thermal deformation during use. Furthermore, in order to allow a reaction with cationic polymeric compounds, it is preferable for the terminal functional groups of the component (D') to be, for example, hydroxyl groups, carboxyl groups, thiol groups, or acid anhydrides. From the standpoint of producing high heat resistance or high solvent resistance, or from the standpoint of affinity with respect to the benzoxazine resin composition, including solubility and adhesion, it is preferable to use polysulfone, polyethersulfone, or polyphenylene sulfide. Specific examples include the polyethersulfone products Sumika Excel® PES3600P, Sumika Excel® PES5003P, Sumika Excel® PES5200P, and Sumika Excel® PES7600P (Sumitomo Chemical Co., Ltd.); Ultrason® E2020P SR and Ultrason® E2021SR (BASF); Virantage® VW10200RP, Virantage® VW10300RP, Virantage® VW10700RP, Virantage VW30500RP (Solvay Specialty Polymers); and the polyethersulfone and polyether ether sulfone copolymer oligomers described in National Publication No. 2004-506789. Additional examples include the polyethersulfone and polyether ether sulfone copolymer oligomers described in National Publication No. 2004-506789, and the polyether imide products Ultem 1000, Ultem 1010, and Ultem 1040 (SABIC Innovative Plastics). The term "oligomers" denotes a polymer having a comparatively low molecular weight in which monomers are bonded in a finite number of roughly ten to 100 units.

The (E) component in the embodiments herein could be at least one type of an additional curing agent such as an epoxy resin curing agent that is selected from the group consisting of aromatic amine, monofunctional phenol, multifunctional phenol, and polyphenol compounds. These compounds have active hydrogens that can react with the epoxy resin of (B). The active hydrogen of these compounds can react with the epoxy resins of (B) which improve both the mechanical and heat resistance. When The (E) component is contained from 0 to 5 parts by weight or less with respect to 100 parts by weight of the benzoxazine resin composition favorable handling properties such as tackiness and drapability can be obtained when forming prepregs.

It is desirable for the benzoxazine resin composition of the present disclosure to be blended with a thermoplastic resin (F) that is present as in the prepreg without dissolving in the resin composition during the prepreg production process. This thermoplastic resin can be in the form of a film, particles, fibers or a combination of these forms. As a result, the toughness and the impact resistance of the matrix resin are improved when a fiber-reinforced composite material is produced.

The shape of the thermoplastic resin (F) can be various forms such as a film, particles, fibers, or a combination of at least two shape of the foregoing. In the case of a film, if the prepreg surface is perfectly covered as described in U.S. Pat. No. 4,604,319, the surface tackiness is lost, but the surface tackiness can be kept by forming through-holes in the film, or by using a porous film, or arranging film tapes or arranging flakes obtained by finely cutting the film as described U.S. Pat. No. 5,985,431, etc.

The thermoplastic resin (F) used as fibers is preferable since the tackiness and drapability of the prepreg are excellent. In this case, the fibers are not limited in fiber length or arrangement. The fibers can be flocks obtained by finely cutting fibers, short fibers, parallel-arranged filaments, or a nonwoven or knitted fabric as described in U.S. Pat. No. 5,985,431.

When the thermoplastic resin (F) is a particle, the particles can be spherical, non-spherical, or porous particles as described in U.S. Pat. No. 5,985,431.

The above film, fibers or particles can be used alone, or they can be used in combination like a film containing fibers or particles, or a mixture of particles and fibers.

The particle can also be a thermoplastic resin (F) consisting of an epoxy resin or bismaleimide resin and thermoplastic resin which have semi-IPN structure as described in U.S. Pat. No. 5,985,431. This combination is excellent in keeping the solvent resistance of the composite material as a whole, since the particles themselves are excellent in solvent resistance.

The material for the thermoplastic resin particle (G) that are used in the present disclosure is selected from the group consisting of polyamide, polycarbonate, polyacetal, polyphenylene oxide, polyphenylene sulfide, polyallylate, polyester, polyamide-imide, polyimide, polyetherimide, polyimide having phenyltrimethylindane structures, polysulfone, polyethersulfone, polyether ketone, polyether ether ketone, polyaramid, polyether nitrile, and polybenzimidazole.

In one embodiment polyamide is used, and of the polyamide group, nylon 12, nylon 11, and nylon 6/12 copolymer can provide particularly good adhesive strength with respect to thermosetting resins. The shape of the thermoplastic resin particles (G) may be spherical or nonspherical, and the particles may be porous, but spherical particles are preferred because of their excellent elasticity, which prevents deterioration of the flow characteristics of the resin, and because they provide high impact resistance due to a lack of origination points for stress concentration. Commercially-available polyamide particles include SP-500 (Toray Industries, Inc.), Toraypearl® TN (Toray Industries, Inc.), Orgasol® 1002D, Orgasol® 2002, and Orgasol® 3202 (Arkema Inc.). Particles may also be used that have different particle diameters or two or more types of different thermoplastic resins.

In another embodiment the thermoplastic (F) in the above various forms is applied to the prepreg such that 90% wt. of the thermoplastic (F) is localized in an area from the surface of the prepreg to a depth of 15% of the thickness of the prepreg. This is preferable to effectively enhance the compressive strength after impact of a composite laminate obtained from the prepreg.

The mean particle diameter of the particles is preferably 5 to 30 μm. Particles having a size in this range are desirable, because this size can prevent loss of mechanical properties due to disruption of the fiber orientations when the material penetrates into the interior parts of the reinforcing fiber layer during infusion of the benzoxazine resin into the reinforcing fiber layer, or due to disruption of the reinforcing fiber layer by large undulations resulting from the presence of unfused particles in the resin layer between the reinforcing fiber layers. Regarding the resin interlayer of the reinforcing fiber in the molded fiber-reinforced composite material that is produced from these particles, it is preferable to select a mean particle diameter and blend amount so that the average thickness of the resin layer is 5 to 40 μm, from the standpoint of impact resistance. However, the particle composition, the particle diameter, and the particle blend amount that are used will depend on the viscosity of the entire benzoxazine resin composition. The thickness of the resin layer referred to herein is the thickness of the resin layer that is present between a given reinforcing fiber layer to an adjacent reinforcing fiber layer. The thickness is determined by observing a cross section of the fiber-reinforced composite material and averaging 50 or more measurements of the distance from the outermost fibers of a given reinforcing fiber layer to the outermost reinforcing fibers of the next reinforcing fiber layer. In addition, these particles may be present at the surface on at least one side of the reinforcing fiber layer of the prepreg, or preferably on both surfaces.

The benzoxazine resin composition of the present disclosure can also be blended with coupling agents, thermosetting resin particles, core-shell particles composed of thermoplastic resins or thermosetting resins, inorganic fillers such as silica gel, carbon black, clay, carbon nanotubes, and metal powders, and the like. Examples of silica fillers are silica nanoparticles. Silica nanoparticles may be pre-dispersed in epoxy resin and may be selected from Nanopox products obtainable from Nano Resins (Germany), examples of which include Nanopox XP0314, XP0516, XP0525, and XP F360.

Core-shell particles with particle diameters of 0.3 μm or less are particularly preferred in order to improve the toughness of the benzoxazine resin composition without greatly compromising the heat resistance or elasticity of the cured product obtained by curing the benzoxazine resin composition. The particle diameter of the core-shell particles is measured as described below. The benzoxazine resin composition is cured by heating for 4 h at 180° C. and for 4 h at 200° C. to obtain a cured resin material with a thickness of 2 mm. Next, part of the resulting cured product is cut away, the core-shell particles are subjected to a dyeing treatment with osmium oxide, and thin strips are cut out and observed at a magnification of 40,000× using a transmission electron microscope (TEM). An average of the diameters of ten core/shell particles chosen randomly is taken. By making these core-shell particles a constituent element of the benzoxazine resin composition, high fracture toughness as well as high flexural modulus can be produced in the cured resin material. On the other hand, if the particle diameter is greater than 0.3 μm, then the flexural modulus of the cured resin material will decrease dramatically in some cases as the blend amount of the core/shell rubber increases.

Examples of commercially-available core-shell rubber particles include Paraloid EXL-2655 (Dow Chemical Company.) which is composed of butadiene-alkyl methacrylate-styrene copolymer, STAPHYLOID AC-3355 and TR2122, which are composed of acrylate ester-methacrylate ester copolymer (GANZ CHEMICAL CO., Ltd.), Paraloid EXL-2611 and EXL-3387 which are composed of butyl acrylate-methyl methacrylate copolymer (Dow Chemical Company), and Kane Ace MX-416 (Kaneka Corp.).

The description "interpenetrating network structure" used for the cured material of the benzoxazine resin composition of the present disclosure refers to a structure in which a network structure (a) formed by the polymerization of (A') is superimposed on a network structure (b) formed by the polymerization of (B'), with the two network structures intertwined with each other. In addition, a semi-interpenetrating network structure may be formed in which a linear polymer (c) composed of thermoplastic resin is added, and the linear polymer (c) is intertwined with the interpenetrating network structure (a-b) including the network structure (a) and the network structure (b). These structures are necessary structures for the manifestation of high resin elasticity, superior toughness and elongation, which are not produced by benzoxazine resin alone or by epoxy resin alone. These structures can be confirmed, for example, by transmission electron microscopy. At this time, observation is preferably carried out after suitable dyeing with osmium or the like. The width of the respective network structures, based on observation of the manifestation of sufficient physical properties in the fiber layer, is preferably such that the size of at least one of the network structures is smaller than the average diameter of the fibers that are used. In particular, it is desirable for the width of either one of the derived network structures to be 1 μm or less in order to manifest uniform physical properties in composite materials.

The kneading method for the benzoxazine resin composition of the present disclosure has no particular restrictions. Methods that are used in the preparation of typical benzoxazine resin compositions may be used. For example, a kneader, planetary mixer, twin-screw extruder, or the like may be used. When a particle component such as flame retardant or inorganic filler is used, it is preferable, from the standpoint of dispersion of the particles, for the particles to be dispersed in liquid-form resin component that is to be blended in the benzoxazine resin composition in advance using a homomixer, three-roll mill, ball mill, bead mill, or ultrasonication. In addition, heating/cooling or compression/ decompression may be used as necessary during preparatory dispersion of the particles or mixing with the matrix resin.

The reinforcing fiber that is used in the present disclosure may be any type of reinforcing fiber that is selected in accordance with the application. However, it is preferable to use carbon fibers with a tensile modulus of 400 GPa or less from the standpoint of rigidity of the composite material. From the standpoint of strength, carbon fibers with a tensile strength of 4.4 to 7.5 GPa are preferred because composite materials with high strength can be produced. Tensile stain is also an important factor from the standpoint of impact resistance, and high-strength, high-strain carbon fibers with a tensile strain of 1.7 to 2.3% are preferred. Thus, the most suitable carbon fibers will have a combination of the characteristics of a tensile modulus of at least 230 GPa, a tensile strength of at least 4.4 GPa, and a tensile strain of at least 1.7%.

Commercially-available carbon fibers include Torayca® M40J-12K, Torayca® T800GC-24K, Torayca® T800SC-24K, Torayca® T810GC-24K, Torayca® T700GC-24K, Torayca® T300-3K, and Torayca® T700SC-12K (Toray Industries, Inc.).

With respect to the shape and alignment of the reinforcing fibers, long fibers that have been pulled into alignment in one direction, woven fabrics of continuous reinforcing fibers, discontinuous short fibers and the like may be selected as appropriate. In order to produce a lightweight fiber-reinforced composite material having optimal mechanical performance, however, it is preferable to use carbon fibers having the form of continuous fibers such as long fibers that have been pulled into alignment in one direction (fiber bundles) or a woven fabric.

The carbon fiber bundles that are used in the embodiments herein could have a filament number in the range of 2500 to 50,000 per fiber bundle. If the filament number is less than 2500, then the fiber alignment will tend to vary, which tends to cause a loss of strength. If the filament number exceeds 50,000, on the other hand, then it will be difficult for resin infusion to occur during prepreg production or during molding. The filament number is more preferably 2800 to 36,000.

The prepreg according to the present disclosure is produced by impregnating reinforcing fiber with the benzoxazine resin composition of the present disclosure. It is preferable for the content by weight of the reinforcing fiber in the prepreg to be 40 to 90 percent by weight, more preferably 50 to 80 percent by weight. If the reinforcing fiber content by weight is too low, the resulting composite material will have lower specific strength and specific modulus, which may compromise the advantage of the fiber-reinforced composite material in regard to its superior specific strength and specific modulus. On the other hand, if the reinforcing fiber content by weight is too high, poor impregnation with the resin composition will occur, and the resulting composite material will tend to have numerous voids and/or dry fibers, which may dramatically decrease its mechanical properties.

The prepreg of the present disclosure can be produced, for example, by the wet method in which the benzoxazine resin composition of the present disclosure is dissolved in a solvent such as methyl ethyl ketone or methanol to reduce its viscosity, followed by infusion into the reinforcement fiber; or by the hot melt method in which the benzoxazine resin composition is heated to reduce its viscosity and is then infused into the reinforcement fiber.

The wet method is a method in which the reinforcement fibers are immersed in a solution of the benzoxazine resin composition and then removed, whereupon the solvent is evaporated off using an oven or the like to obtain a prepreg.

The hot melt method is a method in which the viscosity of the benzoxazine resin composition is reduced by heating, whereupon the composition is directly infused into the reinforcement fiber. Alternatively, resin film is produced by applying the benzoxazine resin composition to mold-release paper or the like, whereupon the resin film is then superimposed on one or both sides of the reinforcement fiber, and then the benzoxazine resin composition is transferred and infused into the reinforcement fiber by heating and compression, thereby producing a prepreg. This hot melt method is preferred, because substantially no solvent remains in the prepreg.

The prepreg that is obtained by infusion of the benzoxazine resin composition in this manner can be trimmed into the form of a tape or strip for use. The specific width may be determined in accordance with the automated lamination device or the like that is to be used to fabricate composite parts with the prepreg.

The fiber-reinforced composite material of the disclosure can be produced by a method such as stacking two or more prepreg plies produced by these methods, then heating and compressing the resulting laminate to bring about heating and curing of the benzoxazine resin composition.

The method for applying heat and pressure may involve press molding, autoclave molding, bagging molding, wrapping tape molding, and internal pressure molding. Wrapping tape molding and internal pressure molding are particularly preferable for producing molded sporting goods.

With wrapping tape molding methods, the prepreg is wrapped onto a core such as a mandrel to produce a fiber-reinforced composite material tube. This method is thus suitable for manufacturing rod-form articles such as golf club shafts and fishing rods. More specifically, the prepreg is wound on the mandrel and then wrapping tape composed of thermoplastic resin film is wound outside the prepreg to fix and apply pressure to the prepreg plate. The benzoxazine resin composition is then heated and cured in an oven, and the core is removed to obtain a tube-shaped body.

With internal pressure molding methods, a preform that is formed by winding prepreg onto an internal pressure-applying body such as a thermoplastic resin tube is placed in a mold, and high pressure gas is introduced through the internal pressure-applying body to apply pressure and simultaneously heat the mold, thereby molding a tube-shaped body. Internal pressure molding methods are particularly desirable when molding complicated shapes, such as golf club shafts, bats, and rackets for tennis and badminton.

The fiber-reinforced composite material of the disclosure can be produced, for example, by a method involving stacking the prepreg of the present disclosure described above in a prescribed shape, then compressing and heating the material to cure the epoxy resin.

The fiber-reinforced composite material of the present disclosure can also be produced by a method in which the benzoxazine resin composition described above is used without employing a prepreg.

Examples of this type of method include methods involving direct impregnation of the reinforcement fiber with the benzoxazine resin composition of the present disclosure, specifically, hand lay-up methods, filament winding methods, pultrusion methods, resin injection molding methods, and resin transfer molding methods.

The fiber-reinforced composite material of the disclosure is preferably used for producing aircraft structural members, windmill blades, external automobile plates, IC trays, notebook computer housings and other computer components, as well as golf club shafts, tennis rackets, and other sporting goods.

EXAMPLES

In the examples presented below, the benzoxazine resin composition of the present disclosure, and the prepreg and fiber-reinforced composite material that utilize it, are described in additional detail. The methods for producing the resin raw materials, the prepregs, and the fiber-reinforced composite materials that are used in the present disclosure, the method for evaluating open-hole compressive strength, and the method for evaluating tensile strength are described below. When not specified otherwise, production and evaluation of the prepregs in the examples were carried out in atmospheres of room temperature (25° C.±2° C.) and 50% relative humidity.

Carbon Fiber

Torayca® T800S-24K-10E (carbon fiber with 24,000 filaments, tensile strength of 5.9 GPa, tensile modulus of 294 GPa, tensile strain of 2.0%, manufactured by Toray Carbon Fibers America, Inc.).

Benzoxazine Resin

F-a (bisphenol F-aniline type, manufactured by Shikoku Chemicals Corp.)

P-d (phenol-diaminodiphenylmethane type, manufactured by Shikoku Chemicals Corp.)

P-a (phenol-aniline type, manufactured by Shikoku Chemicals Corp.)

Araldite® MT35600 (bisphenol A-aniline type, manufactured by Huntsman Advanced Materials)

Araldite® MT35800 (phenolphthalein-aniline type, manufactured by Huntsman Advanced Materials)

Epoxy Resin

Araldite® MY721 (Tetraglycidyldiaminodiphenylmethane, manufactured by Huntsman Advanced Materials)

Araldite® MY0610 (Triglycidyl-m-aminophenol, manufactured by Huntsman Advanced Materials)

34TGDDE synthesized by the method described below (tetraglycidyl-3,4'-diaminodiphenyl ether)

1221.2 g (13.2 mol) of epichlorohydrin was introduced into a four-necked flask equipped with a temperature gage, a dropping funnel, a condensation tube, and a stirrer. The temperature was increased to 70° C. while purging with nitrogen, and 222.2 g (1.1 mol) of 3,4'-diaminodiphenyl ether dissolved in 1020 g of ethanol was added dropwise over a period of 4 h. Stirring was carried out for 6 additional hours, and the addition reaction was brought to completion to obtain N,N,N',N'-tetrakis(2-hydroxy-3-chloropropyl)-3,4'-diaminodiphenyl ether. The temperature in the flask was then decreased to 25° C., 229 g (2.75 mol) of 48% NaOH aqueous solution was added dropwise over a period of 2 h, and stirring was carried out for 1 additional hour.

Upon completion of the cyclization reaction, the ethanol was evaporated off, and extraction was carried out with 408 g of toluene, followed by washing twice with 5% sodium chloride aqueous solution. Upon removing the toluene and epichlorohydrin from the organic layer under reduced pressure, 398 g of brownish viscous liquid was obtained (yield 85.2%). The purity of the tetraglycidyl-3,4'-diaminodiphenyl ether primary product was 84% (GC area %).

Epiclon® 830 (Bisphenol F type epoxy resin, manufactured by DIC Corporation)

Accelerator(Sulfonate Ester, Polymerization Catalyst and the Other Accelerator)

Methyl p-toluenesulfonate (Sigma Aldrich)
Ethyl p-toluenesulfonate (Sigma Aldrich)
Propyl p-toluenesulfonate (Sigma Aldrich)
Ethyl benzenesulfonate (Sigma Aldrich)
Boron trifluoride-piperidine (Stella Chemifa Corp.)
SAN-AID® SI-150 (Sanshin Chemical Industry KK.)
DT310 (Huntsman Advanced Materials)
CUREZOL 2E4MZ (2-Ethyl-4-methylimidazole, Air Products and Chemicals Inc.)

Thermoplastic Resin

VW10700RP (Polyethersulfone, weight-average molecular weight 21,000 g/mol, Solvay Specialty Polymers Japan)

VW30500RP (Polyethersulfone, weight-average molecular weight 14,000 g/mol, Solvay Specialty Polymers Japan)

Thermoplastic resin A produced using the method of JP-2010-1446-A (polyethersulfone, weight-average molecular weight 8300 g/mol)

PES5003P (Polyethersulfone, weight-average molecular weight 47,300 g/mol,
Sumitomo Chemical Co., Ltd.)
Ultem 1000 (Polyether imide, SABIC Innovative Plastics)

Amine Curing Agent

Seikacure® S (4,4'-diaminodiphenylsulfone, Wakayama Seika Kogyo Co., Ltd.)

Thermoplastic Resin Particles

Toraypearl® TN (Toray Industries, Inc.)
SP-500 (Toray Industries, Inc.)
Orgasol® 1002D (Arkema Inc.)

(1)(a) Resin Compositions of First Set

In the respective examples and comparative examples, raw materials were mixed in the ratios indicated in Tables 1 to 5. In Example 1, the (B) component and (D) component were mixed and heated to 150° C. to completely dissolve the solids content, whereupon the materials were cooled to 100° C., and the (A) component was mixed and stirred until completely dissolved. After confirming dissolution, the temperature was decreased to 70° C., and the accelerators which contain the (C) component and/or curing accelerators other than (C) were added and stirred until uniform. When (E) or (G) was added, (E) or (G) was added after stirring the accelerators until uniform, and stirring was then carried out until uniform. After stirring, the material was rapidly cooled in a refrigerator set at 5° C. to obtain a resin composition. With Examples 2 to 23 and Comparative Examples 1 to 7 as well, resin compositions were prepared in a similar manner, with the exception that the blended components were altered as indicated in Table 1.

(1)(b) Resin Compositions of Second Set

In the respective Examples and Comparative Examples, raw materials were mixed in the ratios indicated in Table 6 to 8. Examples are benzoxazine resin compositions which possess an interpenetrating polymer network as described in the specification. Comparative Examples are benzoxazine resin compositions which do not possess an interpenetrating polymer network. In Example 1, the (A') component and (B') component were mixed and heated to 120° C., whereupon the materials were stirred to mix the (A') component until it was completely dissolved. After confirming dissolution, the temperature was decreased to 70° C., the (C') component was added, and the materials were stirred until uniform. After stirring, the material was rapidly cooled in a refrigerator set at 5° C. to obtain a resin composition. With Examples 24 to 34 and Comparative Examples 8 to 13 as well, resin compositions were prepared in a similar manner, with the exception that the blended components were altered as indicated in Table 6.

(2) Pot Life (Rate of Viscosity Increase) Measurement

Evaluation of pot life was carried out based on the rate of viscosity increase of the benzoxazine resin composition at constant temperature. A small rate of viscosity increase indicates that the benzoxazine resin composition or prepreg will be thermally stable during the production process. Measurement of the rate of viscosity increase of the benzoxazine resin composition was carried out using a dynamic viscoelasticity measurement device (ARES, TA Instruments). Measurement was carried out on a resin sample for 3 h at a constant temperature of 90° C. using 40-mm diameter parallel plates, a measurement frequency of 0.5 Hz, and a gap of 1 mm. The formula indicated below is used in order to obtain the rate of viscosity increase from the initial complex viscosity $\eta_I^*$ and the complex viscosity $\eta_E^*$ measured after 3 h.

Rate of viscosity increase=$\eta_E^*/\eta_I^*$

A rate of viscosity increase of 1.5 or less was indicated by ○, 1.5 to <2.0 was indicated by Δ, and 2.0 or greater was indicated by x. ○ means good, Δ means fair, and x means bad, respectively. The results of these measurements are shown in Tables 1 to 3.

(3) Gel Time Measurement

A 2-cm² sample was prepared from the resin compositions described above, and the curing properties of the resin were determined by measuring the gel time using a viscoelasticity measurement device (APA2000, manufactured by Alpha Technology Inc.). The temperature was increased at 2° C./min from 70° C. to 180° C., and the sample was then maintained for 240 min at a constant temperature of 180° C. The time required for the torque to reach 1 N·m after initiation of measurement was taken as the gel time.

(4) Prepreg

The resulting benzoxazine resin composition was applied onto mold-release paper at a resin weight of 50 g/m² using a knife coater to produce a resin film. The resin film was then layered onto both sides of a carbon fiber material (weight 190 g/m²) that had been pulled into alignment in one direction, and a heated roll was used in order to infuse the benzoxazine resin composition into the carbon fiber while heating and compressing at a temperature of 120° C. and 1 atm, thereby producing a prepreg.

(5) Tackiness Measurement

The tackiness of a prepreg produced in (2) above was determined by a tactile method. After pulling away the mold-release paper from the surface of the prepreg, the prepreg was touched with the finger, and materials with favorable tackiness were indicated by ○, materials with slightly too strong or too weak were indicated by Δ, and materials having strong tackiness that could not separate from the finger without pulling off or materials having absolutely no tackiness that did not affix to the finger were indicated by x. ○ means good, Δ means fair, and x means bad, respectively. The number of measurements n was 2 and the lowest result was used when the results differed.

(6) Measurement of 0° Tensile Strength of Fiber-reinforced Composite Material

As described in ASTM D3039-08, the fiber direction of a unidirectional fiber-reinforced composite material is defined as its axis direction, where the direction perpendicular to the axis is defined as 90° when the axis direction is defined as 0°.

A unidirectional prepreg plate was cut to a predetermined size, and six of the sheets were stacked unidirectionally, subjected to vacuum bagging, and cured in an autoclave at a temperature of 180° C. and a pressure of 6 kg/cm² for the cured time described in table 1 to 8 to obtain a unidirectionally reinforced material (fiber-reinforced composite material). This unidirectionally reinforced material was cut to a width of 12.7 mm and a length of 230 mm, and a tab of glass fiber-reinforced plastic with a width of 1.2 mm and a length of 50 mm was adhered to each end to obtain a tensile test specimen. This test specimen was subjected to the 0° tensile test at a measurement temperature of -60° C. using an Instron type universal tester.

(7) Open Hole Compressive Strength (OHC) of the Fiber-reinforced Composite Material Under High-moisture and High-temperature Conditions A unidirectional prepreg was cut to a prescribed size. After layering 16 sheets to produce a $(+45/0/-45/90°)_{2S}$ stacking sequence, vacuum bagging was carried out, and the material was cured for the cured time described in table 1 to 8 at 180° C. and a pressure of 6 kg/cm² using an autoclave to obtain a quasi-isotropic fiber-reinforced composite material. The quasi-isotropic reinforced material was cut into a rectangular shape with a length of 304.8 mm in the 0° direction and a length of 38.1 mm in the 90° direction, and a circular hole with a diameter of 6.35 mm was made in the center to produce a plate with a hole, thus obtaining the open-hole compression test specimen. This test specimen was then subjected to open-hole compressive testing as prescribed in ASTM-D6484 using an Instron type universal tester measured at 82° C. after conditioning the test specimen by soaking for two weeks in hot water at 70° C.

(8) Measurement of Compressive Strength after Impact (CAI) of the Fiber-reinforced Composite Material 24 sheets of unidirectional prepreg were layered in a quasi-isotropic manner with a $(+45/0/-45/90°)_{2S}$ configuration, and the material was molded in an autoclave for 2 h at 180° C., a pressure of 6 kg/cm², and a rate of temperature elevation of 1.5° C./min to obtain a quasi-isotropic fiber-reinforced composite laminate. A sample with a length of 150 mm and a width of 100 mm (thickness 4.5 mm) was cut out, and a central part of the sample was subjected to a dropped weight impact of 6.7 J/mm, in accordance with SACMA SRM 2R-94. After impact, the compressive strength was determined using an Instron type universal tester.

(9) Measurement of Flexural Modulus and Deflection

The resin composition produced in (1)(b) above was heated to a temperature of 80° C. and was introduced into a mold set at a thickness of 2 mm using 2-mm thick Teflon® spacers. The resin composition was then heated for 240 minutes at a constant temperature of 180° C., and was then heated for 240 minutes at 200° C. in order to cure the resin composition. A cured resin plate with a thickness of 2 mm was produced. Next, a test strip with a width of 10 mm and a length of 60 mm was cut from the resulting cured resin plate, and flexure was measured by subjecting the specimen to three point bending with a span of 32 mm. The flexural modulus and deflection were determined in accordance with JIS K7171 (1994). The number of measurements n was 5, and average values were calculated.

(10) Measurement of Exothermic Initiation Temperature and Exothermic Peak Temperature The resin composition prepared in (1)(b) above was used, and the exothermic initiation temperature and exothermic peak temperature were measured according to ASTM D3418-82 using a differential scanning calorimeter (DSC). In the Examples and Comparative Examples of Table 6 to 8, cases in which the absolute value of the temperature differential Ta-Tb was within 30° C. or cases in which a single peak was observed were indicated by "O", and cases in which the temperature differential Ta-Tb was 30 or greater were indicated by "X". O means good, and X means bad, respectively.

(11) Measurement of Rubber Plateau Modulus G'

A 2 cm³ sample was prepared from the resin composition prepared in (1)(b) above, and the rubber plateau modulus G' was measured by the DMA method using a viscoelasticity measurement device (APA2000, manufactured by Alpha Technology Inc.). The temperature was increased at 2° C./min from 70° C. to 180° C. The sample was then maintained for 240 minutes at a constant temperature of 180° C. and for 240 minutes at 200° C. in order to cure the resin composition. After curing, the material was subjected to a second temperature ramp by heating from 40° C. to 300° C. at a temperature ramp rate of 5° C./min, and measurements were carried out at a frequency of 1 Hz. In the G'-temperature curve resulting from the second temperature ramp, the rubber plateau modulus G' is assigned as the value in the flat region deriving from a rubber state that is found on the high temperature side of the glass transition region. If the G' value gradually decreases or increases, and a flat region deriving from a rubber state is not clearly seen, then G' at a temperature that is 50° C. higher than the glass transition temperature is taken as the rubber plateau modulus G'. The term "glass transition temperature" or "Tg" used herein refers to the temperature at the intersection of the tangent line of the glassy state side and the tangent line of the transition region in the G'-temperature curve.

The results of the above measurements are shown in Tables 1 to 8.

From a comparison of Examples 2 and 4 to 6 and Comparative Example 2 to 4, it was found that (C) provides superior CFRP properties and Resin properties.

From a comparison of Examples 2 and Comparative Examples 5, it was found that the use of (D) provided superior Tensile strength when producing fiber-reinforced composite materials. In addition, From a comparison of Examples 7 to 9 and Comparative Examples 6 and 7, it was found that the use of (D) provided superior tackiness when producing prepregs and superior tensile strength when producing fiber-reinforced composite materials.

In addition, from Examples 23 to 26, it was found that the addition of (G) provided superior impact resistance without compromising other characteristics.

The results of the above measurements are shown in Table 6 to 8. With Comparative Examples 8 to 10, no accelerator was used, and a uniform network structure was obtained resulting from addition reactions between (A') and (B'). By comparison of the Examples possessing the benzoxazine resin composition of the present disclosure with the Comparative Examples 8 to 10, it is clear that the benzoxazine resin composition of the present disclosure has unusually high resin elasticity and resin deflection, and that it has both high tensile strength and compressive strength when used as a fiber-reinforced composite material. In addition, from a comparison of the benzoxazine resin composition of the present disclosure with the Comparative Examples 11 to 13 in which the absolute value of the difference of Ta and Tb was 30° C. or greater, it was found that the benzoxazine resin composition of the present disclosure had unusually high tensile strength and compressive strength when used as a fiber reinforcement material.

With Comparative Examples 1 to 3, no polymerization catalyst was used, and a uniform network structure was obtained resulting from addition reactions between (A) and (B). By comparison of the Examples possessing the benzoxazine resin composition of the present disclosure with the Comparative Examples 1 to 3, it is clear that the benzoxazine resin composition of the present disclosure has unusually high resin elasticity and resin deflection, and that it has both high tensile strength and compressive strength when used as a fiber-reinforced composite material. In addition, from a comparison of the benzoxazine resin composition of the present disclosure with the Comparative Examples 4 to 6 in which the absolute value of the difference of Ta and Tb was 30° C. or greater, it was found that the benzoxazine resin composition of the present disclosure had unusually high tensile strength and compressive strength when used as a fiber reinforcement material.

TABLE 1

| | | | Examples | | | | | | |
|---|---|---|---|---|---|---|---|---|---|
| | | | No. 1 | No. 2 | No. 3 | No. 4 | No. 5 | No. 6 | No. 7 |
| Benzoxazine resin composition for fiber reinforced composite | Benzoxazine [A] | F-a | 54 | 60 | 60 | 60 | 60 | 60 | 60 |
| | | P-d | | | | | | | |
| | | MT35600 | | | | | | | |
| | | MT35800 | | | | | | | |
| | Epoxy Resin [B] | MY721 | 40 | 35 | 30 | 35 | 35 | 35 | 40 |
| | | MY0610 | | | | | | | |
| | | 34TGDDE | | | | | | | |
| | Sulfonate ester [C] | Methyl p-toluenesulfonate | | | | | | | |
| | | Ethyl p-toluenesulfonate | 1.5 | 1.5 | 1.5 | 0.5 | 2 | 4.5 | 1.5 |
| | | Propyl p-toluenesulfonate | | | | | | | |
| | | Ethyl benzenesulfonate | | | | | | | |
| | Thermoplastics [D] | VW10700RP | 5.0 | 5.0 | 5 | 5 | 5 | 5 | 7 |
| | | VW30500RP | | | | | | | |
| | | Polyethersulfone "A" | | | | | | | |
| Cured time of prepreg (h) | | | 2 | 2 | 2 | 2 | 2 | 2 | 2 |
| CFRP properties | | Open hole compression strength (MPa) | 323 | 330 | 337 | 330 | 330 | 329 | 330 |
| | | Tensile strength (MPa) | 2830 | 2760 | 2642 | 2580 | 2892 | 2960 | 2894 |
| Prepreg properties | | Tackiness | ○ | ○ | ○ | ○ | ○ | ○ | ○ |
| Resin properties | | Pot life | ○ | ○ | ○ | ○ | ○ | ○ | ○ |
| | | Gel time | 94 | 90 | 88 | 130 | 80 | 60 | 94 |

TABLE 2

| | | | Examples | | | | | |
|---|---|---|---|---|---|---|---|---|
| | | | No. 8 | No. 9 | No. 10 | No. 11 | No. 12 | No. 13 |
| Benzoxazine resin composition for fiber reinforced composite | Benzoxazine [A] | F-a | 60 | 60 | | | | |
| | | P-d | | | 55 | | | |
| | | MT35600 | | | | 55 | | |
| | | MT35800 | | | | | 55 | 50 |
| | Epoxy Resin [B] | MY721 | 40 | 40 | 35 | 35 | 35 | 15 |
| | | MY0610 | | | | | | |
| | | 34TGDDE | | | | | | |
| | Sulfonate ester [C] | Methyl p-toluenesulfonate | | | | | | |
| | | Ethyl p-toluenesulfonate | 1.5 | 1.5 | | | | |
| | | Propyl p-toluenesulfonate | | | 1.5 | 1.5 | 1.5 | 2 |
| | | Ethyl benzenesulfonate | | | | | | |
| | Thermoplastics [D] | VW10700RP | | | | | | |
| | | VW30500RP | 7 | | 5 | 5 | 5 | 5 |
| | | Polyethersulfone "A" | | 7 | | | | |
| | Benzoxazine other than [A] | P-a | | | | | | 15 |
| Cured time of prepreg (h) | | | 2 | 2 | 2 | 2 | 2 | 2 |
| CFRP properties | | Open hole compression strength (MPa) | 322 | 316 | 310 | 322 | 330 | 329 |
| | | Tensile strength (MPa) | 2824 | 2760 | 2891 | 2838 | 2862 | 2625 |
| Prepreg properties | | Tackiness | ○ | ○ | ○ | ○ | ○ | ○ |
| Resin properties | | Pot life | ○ | ○ | ○ | ○ | ○ | ○ |
| | | Gel time | 90 | 88 | 99 | 105 | 88 | 68 |

TABLE 3

| | | | Examples | | | | | |
|---|---|---|---|---|---|---|---|---|
| | | | No. 14 | No. 15 | No. 16 | No. 17 | No. 18 | No. 19 |
| Benzoxazine resin composition for fiber reinforced composite | Benzoxazine [A] | F-a | | 60 | 60 | 60 | 60 | 60 |
| | | P-d | | | | | | |
| | | MT35600 | | | | | | |
| | | MT35800 | 50 | | | | | |
| | Epoxy Resin [B] | MY721 | | | | 35 | 35 | 35 |
| | | MY0610 | | 35 | | | | |
| | | 34TGDDE | 15 | | 35 | | | |
| | Sulfonate ester [C] | Methyl p-toluenesulfonate | | | | 1.5 | | |
| | | Ethyl p-toluenesulfonate | | 1.5 | 1.5 | | | |
| | | Propyl p-toluenesulfonate | 2 | | | | 1.5 | |
| | | Ethyl benzenesulfonate | | | | | | 1.5 |
| | Thermoplastics [D] | VW10700RP | | | | | | |
| | | VW30500RP | 5 | 7 | 7 | 7 | 7 | 7 |
| | | Polyethersulfone "A" | | | | | | |
| | Benzoxazine other than [A] | P-a | 15 | | | | | |
| Cured time of prepreg (h) | | | 2 | 2 | 2 | 2 | 2 | 2 |
| CFRP properties | | Open hole compression strength (MPa) | 337 | 332 | 344 | 331 | 325 | 322 |
| | | Tensile strength (MPa) | 2689 | 2770 | 2892 | 2844 | 2818 | 2766 |
| Prepreg properties | | Tackiness | ○ | ○ | ○ | ○ | ○ | ○ |
| Resin properties | | Pot life | ○ | ○ | ○ | ○ | ○ | ○ |
| | | Gel time | 72 | 61 | 94 | 80 | 92 | 94 |

TABLE 4

| | | | Examples | | | |
|---|---|---|---|---|---|---|
| | | | No. 20 | No. 21 | No. 22 | No. 23 |
| Benzoxazine resin composition for fiber reinforced composite | Benzoxazine [A] | F-a | 60 | 60 | 60 | 60 |
| | | P-d | | | | |
| | | MT35600 | | | | |
| | | MT35800 | | | | |
| | Epoxy Resin [B] | MY721 | 35 | 35 | 35 | 35 |
| | | MY0610 | | | | |
| | | 34TGDDE | | | | |
| | Sulfonate ester [C] | Methyl p-toluenesulfonate | | | | |
| | | Ethyl p-toluenesulfonate | 1.5 | 1.5 | 1.5 | 1.5 |
| | | Propyl p-toluenesulfonate | | | | |
| | | Ethyl benzenesulfonate | | | | |
| | Thermoplastics [D] | VW10700RP | | | | |
| | | VW30500RP | 7 | 7 | 7 | 7 |
| | | Polyethersulfone "A" | | | | |

TABLE 4-continued

Examples

| | | | No. 20 | No. 21 | No. 22 | No. 23 |
|---|---|---|---|---|---|---|
| | Thermoplastic particle [G] | Toraypearl ® TN | 10 | 20 | | |
| | | SP-500 | | | 20 | |
| | | Orgasol ® 1002D | | | | 20 |
| Cured time of prepreg (h) | | | 2 | 2 | 2 | 2 |
| CFRP properties | | Open hole compression strength (MPa) | 324 | 322 | 320 | 318 |
| | | Tensile strength (MPa) | 2770 | 2780 | 2790 | 2800 |
| | | Compression after impact strength (MPa) | 268 | 296 | 303 | 276 |
| Prepreg properties | | Tackiness | ◯ | ◯ | ◯ | ◯ |
| Resin properties | | Pot life | ◯ | ◯ | ◯ | ◯ |
| | | Gel time | 91 | 92 | 93 | 94 |

TABLE 5

Comparative Examples

| | | | No. 1 | No. 2 | No. 3 | No. 4 | No. 5 | No. 6 | No. 7 |
|---|---|---|---|---|---|---|---|---|---|
| Benzoxazine resin composition for fiber reinforced composite | Benzoxazine [A] | F-a | | 60 | 60 | 60 | 60 | 60 | 60 |
| | | P-d | | | | | | | |
| | | MT35600 | | | | | | | |
| | | MT35800 | | | | | | | |
| | Epoxy Resin [B] | MY721 | 70 | 35 | 35 | 35 | 35 | 35 | 35 |
| | | MY0610 | | | | | | | |
| | | 34TGDDE | | | | | | | |
| | Sulfonate ester [C] | Methyl p-toluenesulfonate | | | | | | | |
| | | Ethyl p-toluenesulfonate | | | | | 1.5 | 1.5 | 1.5 |
| | | Propyl p-toluenesulfonate | | | | | | | |
| | | Ethyl benzenesulfonate | | | | | | | |
| | Thermoplastics [D] | VW10700RP | | 5.0 | 5.0 | 5.0 | | | |
| | | VW30500RP | | | | | | | |
| | | Polyethersulfone "A" | | | | | | | |
| | Amine curing agent [E] | Seikacure ® S | 40 | | | | | | |
| | Epoxy resin other than [B] | Epiclon 830 | 30 | | | | | | |
| | Thermoplastic other than [D] | PES5003P | | | | | | 7 | |
| | | Ultem 1000 | 10 | | | | | | 7 |
| | Accelerator other than [C] | DT310 | | | 1.5 | | | | |
| | | CUREZOL 2E4MZ | | | | 1.5 | | | |
| Cured time of prepreg (h) | | | 2 | 2 | 2 | 2 | 2 | 2 | 2 |
| CFRP properties | | Open hole compression strength (MPa) | 228 | 313 | 308 | 307 | 324 | 316 | precipitation during process |
| | | Tensile strength (MPa) | 2892 | 2590 | 2430 | 2655 | 2077 | 2552 | |
| Prepreg properties | | Tackiness | ◯ | ◯ | ◯ | ◯ | ◯ | x | |
| Resin properties | | Pot life | ◯ | ◯ | Δ | x | ◯ | ◯ | |
| | | Gel time | 90 | 150 | 180 | 25 | 80 | 95 | |

TABLE 6

Examples

| | | | No. 24 | No. 25 | No. 26 | No. 27 | No. 28 | No. 29 |
|---|---|---|---|---|---|---|---|---|
| Benzoxazine resin composition for fiber reinforced composite | Benzoxazine [A'] | F-a | 54 | 60 | 60 | | | |
| | | P-d | | | | | | 60 |
| | | MT35600 | | | | | 60 | |
| | | MT35800 | | | | 60 | | |
| | | P-a | | | | | | |
| | Epoxy Resin [B'] | MY721 | 40 | 35 | 30 | 35 | 35 | 35 |
| | | MY0610 | | | | | | |
| | | Epiclon830 | | | | | | |
| | Accelator [C'] | Methyl p-toluenesulfonate | | | | | | |
| | | Ethyl p-toluenesulfonate | 3.0 | 1.5 | 1.0 | 3.0 | 1.0 | 1.5 |
| | | Boron trifluoride-peperidine | | | | | | |
| | | SI-150 | | | | | | |
| | Accelerator other than [C'] | DT310 | | | | | | |
| | | CUREZOL 2E4Mz | | | | | | |
| Cured time of prepreg (h) | | | 4 | 4 | 4 | 4 | 4 | 4 |
| CFRP properties | | Open hole compression strength (MPa) | 340 | 330 | 322 | 345 | 330 | 310 |
| | | Tensile strength (MPa) | 2910 | 2830 | 2780 | 2960 | 2894 | 2760 |

TABLE 6-continued

| | | Examples | | | | | |
|---|---|---|---|---|---|---|---|
| | | No. 24 | No. 25 | No. 26 | No. 27 | No. 28 | No. 29 |
| Resin properties | Flexural modulus (GPa) | 5.4 | 5.3 | 5.2 | 5.3 | 5.1 | 4.3 |
| | Flexural deflection (mm) | 3.0 | 3.1 | 3.4 | 3.5 | 3.3 | 4.1 |
| | Rubber plateau modulus (MPa) | 5.5 | 6.4 | 8.2 | 6.5 | 6.7 | 7.2 |
| | Ta-Tb | ○ | ○ | ○ | ○ | ○ | ○ |
| | Exothermic initiation temperature (° C.) | 110 | 115 | 122 | 99 | 134 | 129 |
| | Pot life | ○ | ○ | ○ | ○ | ○ | ○ |

TABLE 7

| | | | Examples | | | | |
|---|---|---|---|---|---|---|---|
| | | | No. 30 | No. 31 | No. 32 | No. 33 | No. 34 |
| Benzoxazine resin composition for fiber reinforced composite | Benzoxazine [A'] | F-a | 60 | | 60 | 60 | 60 |
| | | P-d | | | | | |
| | | MT35600 | | | | | |
| | | MT35800 | | 50 | | | |
| | | P-a | | | | | |
| | Epoxy Resin [B'] | MY721 | | | 35 | 35 | 35 |
| | | MY0610 | 35 | 15 | | | |
| | | Epiclon830 | | 15 | | | |
| | Accelator [C'] | Methyl p-toluenesulfonate | | | | 1.5 | |
| | | Ethyl p-toluenesulfonate | 1.5 | 1.5 | | | |
| | | Boron trifluoride-peperidine | | | 1.5 | | |
| | | SI-150 | | | | | 1.5 |
| | Accelator other than [C'] | DT310 | | | | | |
| | | CUREZOL 2E4MZ | | | | | |
| Cured time of prepreg (h) | | | 4 | 4 | 4 | 4 | 4 |
| CFRP properties | Open hole compression strength (MPa) | | 329 | 305 | 323 | 328 | 330 |
| | Tensile strength (MPa) | | 2740 | 2830 | 2770 | 2790 | 2892 |
| Resin properties | Flexural modulus (GPa) | | 5.4 | 4.3 | 4.9 | 5.2 | 5.2 |
| | Flexural deflection (mm) | | 2.9 | 3.0 | 3.5 | 3.3 | 3.1 |
| | Rubber plateau modulus (MPa) | | 8.4 | 5.2 | 7.0 | 6.3 | 7.2 |
| | Ta-Tb | | ○ | ○ | ○ | ○ | ○ |
| | Exothermic initiation temperature (° C.) | | 120 | 123 | 94 | 102 | 134 |
| | Pot life | | ○ | ○ | ○ | ○ | ○ |

TABLE 8

| | | | Comparative Examples | | | | | |
|---|---|---|---|---|---|---|---|---|
| | | | No. 8 | No. 9 | No. 10 | No. 11 | No. 12 | No. 13 |
| Benzoxazine resin composition for fiber reinforced composite | Benzoxazine [A'] | F-a | 60 | | | 65 | | |
| | | P-d | | | | | 65 | |
| | | MT35600 | | | | | | 65 |
| | | MT35800 | | 80 | 75 | | | |
| | | P-a | | 20 | | | | |
| | Epoxy Resin [B'] | MY721 | 35 | | | 35 | 35 | 35 |
| | | MY0610 | | | | | | |
| | | Epiclon830 | | | 25 | | | |
| | Accelator [C'] | Methyl p-toluenesulfonate | | | | | | |
| | | Ethyl p-toluenesulfonate | | | | | | |
| | | Boron trifluoride-peperidine | | | | | | |
| | | SI-150 | | | | | | |
| | Accelator other than [C'] | DT310 | | | | | 1.5 | |
| | | CUREZOL 2E4MZ | | | | 1.5 | | 1.5 |
| Cured time of prepreg (h) | | | 4 | 4 | 4 | 4 | 4 | 4 |
| CFRP properties | Open hole compression strength (MPa) | | 310 | 290 | 309 | 308 | 285 | 306 |
| | Tensile strength (MPa) | | 2250 | 2040 | 2080 | 2110 | 2150 | 2120 |

TABLE 8-continued

| | | Comparative Examples | | | | | |
|---|---|---|---|---|---|---|---|
| | | No. 8 | No. 9 | No. 10 | No. 11 | No. 12 | No. 13 |
| Resin properties | Flexural modulus (GPa) | 4.9 | 4.6 | 4.6 | 4.7 | 3.9 | 4.6 |
| | Flexural deflection (mm) | 1.8 | 1.6 | 1.7 | 2.2 | 2.7 | 2.1 |
| | Rubber plateau modulus (MPa) | 19.3 | 3.0 | 7.2 | 15.9 | 15.6 | 16.1 |
| | Ta-Tb | ○ | ○ | ○ | x | x | x |
| | Exothermic initiation temperature (° C.) | 194 | 185 | 180 | 98 | 111 | 109 |
| | Pot life | ○ | ○ | ○ | x | x | x |

With Comparative Examples 1 to 3, no polymerization catalyst was used, and a uniform network structure was obtained resulting from addition reactions between (A) and (B). By comparison of the Examples possessing the benzoxazine resin composition of the present disclosure with the Comparative Examples 1 to 3, it is clear that the benzoxazine resin composition of the present disclosure has unusually high resin elasticity and resin deflection, and that it has both high tensile strength and compressive strength when used as a fiber-reinforced composite material. In addition, from a comparison of the benzoxazine resin composition of the present disclosure with the Comparative Examples 4 to 6 in which the absolute value of the difference of Ta and Tb was 30° C. or greater, it was found that the benzoxazine resin composition of the present disclosure had unusually high tensile strength and compressive strength when used as a fiber reinforcement material.

APPLICATIONS

The fiber-reinforced composite material obtained from the benzoxazine resin composition of the present disclosure is particularly well-suited for use in structural materials due to its superior mechanical properties in extreme environments involving high temperature and high pressure or low temperature. For example, the disclosure is well-suited for use in the aerospace industry as a material for primary structural members for aircraft such as main wings, tail assemblies, and floor beams and for secondary structural members such as flaps, ailerons, cowls, fairings, and interior members, as well as in rocket motor cases and structural members for artificial satellites. With respect to common industrial applications, the disclosure is useful as a material for structural members, drive shafts, leaf springs, windmill blades, pressurized vessels, and flywheels in vehicles such as automobiles, ships and railroad cars, as well as papermaking rollers, and materials for civil engineering and construction such as roofing materials, cables, reinforcing bars, and repair and reinforcing materials. The disclosure is also well suited for sporting applications, such as golf club shafts, fishing rods, rackets for tennis, badminton, squash, and the like, hockey sticks and the like, and ski poles.

While the disclosure is described and illustrated here in the context of a limited number of embodiments, the disclosure may be embodied in many forms without departing from the spirit of the essential characteristics of the disclosure. The illustrated and described embodiments, including what is described in the abstract of the disclosure, are therefore to be considered in all respects as illustrative and not restrictive. The scope of the disclosure is indicated by the appended claims rather than by the foregoing description, and all changes that come within the meaning and range of equivalency of the claims are intended to be embraced therein.

What is claimed is:

1. A benzoxazine resin composition comprising at least (A) to (D) below:
   (A) a multifunctional benzoxazine resin having at least two of the structures of Formula I;

Formula I

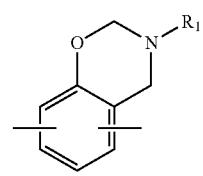

(I)

(B) a multifunctional epoxy resin that is a liquid at 40° C. and has three or more glycidyl groups;
   (C) a sulfonate ester, and
   (D) a thermoplastic resin that is a polyethersulfone having a weight-average molecular weight of 7,000 to 30,000 g/mol,
   wherein in Formula (I), $R_1$ denotes a linear alkyl group with a carbon number of 1 to 12, a cyclic alkyl group with a carbon number of 3 to 8, a phenyl group, or a phenyl group that is substituted with a linear alkyl group having a carbon number of 1 to 12 or a halogen, with a hydrogen being bonded to at least one of the carbon atoms at the ortho-position and the para-position with respect to a carbon atom to which an aromatic-ring oxygen atom is bonded,
   wherein 50 mol % or more of the terminal functional groups of the thermoplastic resin of (D) are hydroxyl groups or amino groups, wherein the blend amount of (D) is 2to 20 parts by weight with respect to a total of 100 parts by weight of (A) and (B),
   wherein the equivalent ratio (A)/(B) of the benzoxazine functional groups of (A) and the epoxy groups of (B) is 0.5 to 1.2,
   wherein 70 to 100 percent by mass of (B) comprises glycidylamine type epoxy.

2. The benzoxazine resin composition according to claim 1, wherein the blend amount of a constituent (E) is 5 parts by weight or less with respect to 100 parts by weight of the entire benzoxazine resin composition, wherein the constituent (E) is at least one type of epoxy resin curing agent that is selected from the group consisting of aromatic amines, nionofunctional phenols, multifunctional phenol compounds, polyphenol compounds, and combinations thereof.

3. The benzoxazine resin composition according to claim 1, wherein (C) comprises benzenesulfonate ester or toluenesulfonate ester.

4. The benzoxazine resin composition according to claim 3, wherein the blend amount of (C) is 0.5 to 5 parts by weight with respect to 100 parts by weight of the entire benzoxazine resin composition.

5. The benzoxazine resin composition of claim 3, further comprising a constituent (G), wherein the constituent (G) comprises thermoplastic resin particles with an average particle diameter of 5 to 30 μm.

6. A prepreg comprising the benzoxazine resin composition. according to any of claims 1, 2, 3 to 4 and carbon fiber.

7. The benzoxazine resin composition according to claim 1, wherein a reaction initiation temperature determined using a differential scanning calorimeter (DSC) at a temperature ramp rate of 10° C/min is in the range of 90° C. to 180° C.

8. The benzoxazine resin composition according to claim 7, wherein the difference between an exothermic peak Ta for a reaction of the benzoxazine resin and an exothermic peak Tb for a reaction of the epoxy resin determined using a differential scanning calorimeter (DSC) at a temperature ramp rate of 10° C/min is 30° C. or less.

9. The benzoxazine resin composition according to claim 1, wherein (C) comprises benzenesulfonate ester or toluenesulfonate ester.

10. The benzoxa.zine resin composition according to claim 9, wherein the blend amount of (C) is 0.5 to 5 parts by weight with respect to 100 parts by weight of the entire benzoxazine resin composition.

11. The benzoxazine resin composition according to claim 10, wherein further comprising a constituent (G), wherein the constituent (G) comprises thermoplastic resin particles.

12. A prepreg comprising the benzoxazine resin composition according to claim 11 and carbon fiber.

13. The benzoxazine resin composition of claim 1, wherein the blend amount of (D) is 2 to 7.7 parts by weight with respect to a total of 100 parts by weight of (A) and (B).

* * * * *